US012275235B2

(12) United States Patent
Hiramatsu et al.

(10) Patent No.: US 12,275,235 B2
(45) Date of Patent: Apr. 15, 2025

(54) DRYING APPARATUS, PRINTING MEDIUM ANTI-DROP METHOD AND NON-CONTACT SUPPORT MEMBER POSITION ADJUSTING METHOD

(71) Applicant: SCREEN HOLDINGS CO., LTD., Kyoto (JP)

(72) Inventors: Kenta Hiramatsu, Kyoto (JP); Yoshikuni Takeichi, Kyoto (JP); Ryota Uemura, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 291 days.

(21) Appl. No.: 18/168,019

(22) Filed: Feb. 13, 2023

(65) Prior Publication Data

US 2023/0302823 A1 Sep. 28, 2023

(30) Foreign Application Priority Data

Mar. 22, 2022 (JP) ................................. 2022-045572

(51) Int. Cl.
*B41J 11/00* (2006.01)
*B41J 11/02* (2006.01)
(Continued)

(52) U.S. Cl.
CPC .......... *B41J 11/0022* (2021.01); *B41J 11/004* (2013.01); *B41J 11/0055* (2013.01); (Continued)

(58) Field of Classification Search
CPC ....... B41J 11/08; B41J 11/004; B41J 11/0055; B41J 11/02; B41J 11/0022; F26B 13/108; F26B 21/004
See application file for complete search history.

(56) References Cited

U.S. PATENT DOCUMENTS 4,288,015 A 9/1981 Curtin
6,364,247 B1 * 4/2002 Polkinghorne .......... G03B 1/52 242/364.11
(Continued)

FOREIGN PATENT DOCUMENTS

JP 2005-219871 A 8/2005
JP 2009-029144 A 2/2009
(Continued)

OTHER PUBLICATIONS

Partial European Search Report issued in corresponding European Patent Application No. 23156821.3-1002, dated Aug. 16, 2023.

*Primary Examiner* — Geoffrey S Mruk
(74) *Attorney, Agent, or Firm* — Rimon P.C.

(57) ABSTRACT

The anti-drop members **7*l* and 7*r* are provided to each of the air turn bars 6*u* and 6*l*, and the respective anti-drop peripheral surfaces 711 of the anti-drop members 7*l* and 7*r* adjoin the support peripheral surface 611 of each of the air turn bars 6*u* and 6*l*. In this configuration, on the occurrence of oblique traveling of the printing medium M, the printing medium M is deviated from the support peripheral surface 611 of each of the air turn bars 6*u* and 6*l* to the anti-drop peripheral surface 711 of the anti-drop member 7*l* or 7*r*. Specifically, the anti-drop peripheral surface 711 of each of the anti-drop members 7*l* and 7*r*** allows the printing medium M to be supported while providing the clearance Δ from the front surface M1 of the printing medium M deviated by the oblique traveling.

17 Claims, 10 Drawing Sheets

(51) Int. Cl.
*B41J 11/08* (2006.01)
*F26B 21/00* (2006.01)
*F26B 13/10* (2006.01)

(52) U.S. Cl.
CPC ................ *B41J 11/02* (2013.01); *B41J 11/08* (2013.01); *F26B 13/108* (2013.01); *F26B 21/004* (2013.01)

(56) References Cited

U.S. PATENT DOCUMENTS

| | | | |
|---|---|---|---|
| 6,427,941 | B1 | 8/2002 | Hikita |
| 2020/0292232 | A1 | 9/2020 | Uemura et al. |

FOREIGN PATENT DOCUMENTS

| | | | |
|---|---|---|---|
| JP | 2020-050455 | A | 4/2020 |
| JP | 2020-148383 | A | 9/2020 |
| JP | 2021-046309 | A | 3/2021 |

* cited by examiner

DRYING APPARATUS, PRINTING MEDIUM ANTI-DROP METHOD AND NON-CONTACT SUPPORT MEMBER POSITION ADJUSTING METHOD

CROSS REFERENCE TO RELATED APPLICATION

The disclosure of Japanese Patent Application No. 2022-045572 filed on Mar. 22, 2022 including specification, drawings and claims is incorporated herein by reference in its entirety.

BACKGROUND OF THE INVENTION

1. Field of the Invention

The present invention relates to a technique of drying a printing medium with ink adhering on the printing medium by injection of gas.

2. Description of the Related Art

Japanese Patent Application Laid-Open No. 2020-148383 shows a drying apparatus that dries a printing medium with ink adhering on the printing medium by injecting gas from a nozzle onto the printing medium. This drying apparatus has a stack including an upper-stage transfer part, a middle-stage transfer part, and a lower-stage transfer part. The printing medium passes through the upper-stage transfer part, a middle-stage transfer part, and the lower-stage transfer part in this order. In particular, each of the transfer parts includes a plurality of nozzles arranged in a horizontal direction above the printing medium, and a plurality of nozzles arranged in the horizontal direction below the printing medium. Gas is injected from each of the upper nozzles and each of the lower nozzles onto the printing medium, thereby transferring the printing medium in the horizontal direction while floating the printing medium from the nozzles.

Two air turn bars are provided one above the other in order to fold the printing medium over from the middle-stage transfer part to the lower-stage transfer part. These air turn bars change a traveling direction of the printing medium while supporting the printing medium in a non-contact manner by injecting gas onto the printing medium. More specifically, the upper air turn bar changes a traveling direction of the printing medium having been transferred from the middle-stage transfer part from a direction toward one side of the horizontal direction to a downward direction. The lower air turn bar changes a traveling direction of the printing medium having been transferred from the upper air turn bar from the downward direction to a direction toward the other side of the horizontal direction.

SUMMARY OF THE INVENTION

In the above-described drying apparatus, in a zone covering the middle-stage transfer part, the two air turn bars, and the lower-stage transfer part, the printing medium is transferred by floating transfer in the absence of a member to support the printing medium by contact with the printing medium. This makes the printing medium susceptible to the influence of wind generated by the gas injected from the nozzle of each transfer part. As a result, in some cases, the printing medium travels obliquely in a width direction to drop from the air turn bar.

The present invention has been made in view of the above-described problem. Regarding a technique of drying a printing medium by injecting gas onto the printing medium, the present invention is intended to prevent drop of the printing medium from a non-contact support member that supports the printing medium in a non-contact manner.

According to the first aspect of the present invention, a drying apparatus comprises: a first transfer part including a plurality of first upper nozzles arranged in a horizontal direction above an elongated strip-shaped printing medium having a printing surface on which ink is adhered and a non-printing surface on the reverse side from the printing surface, and a plurality of first lower nozzles arranged in the horizontal direction below the printing medium, the first transfer part injecting gas onto the printing medium from the first upper nozzles and injecting gas onto the printing medium from the first lower nozzles, and transferring the printing medium toward one side of the horizontal direction with the printing surface pointed downward; a first non-contact support member including a first support peripheral surface to face the printing surface of the printing medium having been transferred from the first transfer part toward the one side, and a plurality of first injection holes opening at the first support peripheral surface, the first non-contact support member changing a traveling direction of the printing medium from a direction toward the one side of the horizontal direction to a downward direction while supporting the printing surface of the printing medium in a non-contact manner by injecting gas from the first injection holes onto the printing surface of the printing medium; a second non-contact support member including a second support peripheral surface to face the printing surface of the printing medium having been transferred downward from the first non-contact support member, and a plurality of second injection holes opening at the second support peripheral surface, the second non-contact support member changing a traveling direction of the printing medium from the downward direction to a direction toward the other side of the horizontal direction on the reverse side from the one side while supporting the printing surface of the printing medium in a non-contact manner by injecting gas from the second injection holes onto the printing surface of the printing medium; a second transfer part including a plurality of second upper nozzles arranged in the horizontal direction above the printing medium having been transferred toward the other side of the horizontal direction from the second non-contact support member, and a plurality of second lower nozzles arranged in the horizontal direction below the printing medium, the second transfer part injecting gas onto the printing medium from the second upper nozzles and injecting gas onto the printing medium from the second lower nozzles, and transferring the printing medium toward the other side of the horizontal direction with the printing surface pointed upward; two first anti-drop members provided at corresponding both ends of the first non-contact support member in a width direction of the printing medium; and two second anti-drop members provided at corresponding both ends of the second non-contact support member in the width direction of the printing medium, wherein each of the first anti-drop members includes a first anti-drop peripheral surface adjoining the first support peripheral surface of the first non-contact support member in the width direction, each of the second anti-drop members includes a second anti-drop peripheral surface adjoining the second support peripheral surface of the second non-contact support member in the width direction, when the printing medium travels obliquely to be deviated from the first support peripheral surface to the first anti-drop peripheral surface, the gas injected from the first injection holes at the first support peripheral surface flows through a clearance between the first support peripheral surface and the printing surface of the printing medium facing the first support peripheral surface toward the first anti-drop peripheral surface to form a clearance between the first anti-drop peripheral surface and the printing surface of the printing medium facing the first anti-drop peripheral surface, and when the printing medium travels obliquely to be deviated from the second support peripheral surface to the second anti-drop peripheral surface, the gas injected from the second injection holes at the second support peripheral surface flows through a clearance between the second support peripheral surface and the printing surface of the printing medium facing the second support peripheral surface toward the second anti-drop peripheral surface to form a clearance between the second anti-drop peripheral surface and the printing surface of the printing medium facing the second anti-drop peripheral surface.

According to the first aspect of the present invention, a printing medium anti-drop method of preventing drop of an elongated strip-shaped printing medium having a printing surface on which ink is adhered and a non-printing surface on the reverse side from the printing surface in a drying apparatus comprising: a first transfer part that transfers the printing medium toward one side of a horizontal direction with the printing surface pointed downward; a first non-contact support member that changes a traveling direction of the printing medium having been transferred from the first transfer part toward the one side from a direction toward the one side of the horizontal direction to a downward direction; a second non-contact support member that changes a traveling direction of the printing medium having been transferred downward from the first non-contact support member from the downward direction to a direction toward the other side of the horizontal direction on the reverse side from the one side; and a second transfer part that transfers the printing medium having been transferred toward the other side of the horizontal direction from the second non-contact support member toward the other side of the horizontal direction with the printing surface pointed upward, the printing medium anti-drop method comprises: a first anti-drop step of preventing drop of the printing medium from the first non-contact support member by two first anti-drop members provided at corresponding both ends of the first non-contact support member in a width direction of the printing medium when the printing medium travels obliquely while deviated from the first non-contact support member to the first anti-drop member; and a second anti-drop step of preventing drop of the printing medium from the second non-contact support member by two second anti-drop members provided at corresponding both ends of the second non-contact support member in the width direction of the printing medium when the printing medium travels obliquely while deviated from the second non-contact support member to the second anti-drop member, wherein the first transfer part includes a plurality of first upper nozzles arranged in the horizontal direction above the printing medium and a plurality of first lower nozzles arranged in the horizontal direction below the printing medium, and injects gas onto the printing medium from the first upper nozzles and injects gas onto the printing medium from the first lower nozzles, the first non-contact support member includes a first support peripheral surface to face the printing surface of the printing medium having been transferred from the first transfer part toward the one side and a plurality of first injection holes opening at the first support peripheral surface, and supports the printing surface of the printing medium in a non-contact manner by injecting gas from the first injection holes onto the printing surface of the printing medium, the second non-contact support member includes a second support peripheral surface to face the printing surface of the printing medium having been transferred downward from the first non-contact support member and a plurality of second injection holes opening at the second support peripheral surface, and supports the printing surface of the printing medium in a non-contact manner by injecting gas from the second injection holes onto the printing surface of the printing medium, the second transfer part includes a plurality of second upper nozzles arranged in the horizontal direction above the printing medium having been transferred toward the other side of the horizontal direction from the second non-contact support member and a plurality of second lower nozzles arranged in the horizontal direction below the printing medium, and injects gas onto the printing medium from the second upper nozzles and injects gas onto the printing medium from the second lower nozzles, each of the first anti-drop members includes a first anti-drop peripheral surface adjoining the first support peripheral surface of the first non-contact support member in the width direction, each of the second anti-drop members includes a second anti-drop peripheral surface adjoining the second support peripheral surface of the second non-contact support member in the width direction, in the first anti-drop step, the gas injected from the first injection holes at the first support peripheral surface flows through a clearance between the first support peripheral surface and the printing surface of the printing medium facing the first support peripheral surface toward the first anti-drop peripheral surface to form a clearance between the first anti-drop peripheral surface and the printing surface of the printing medium facing the first anti-drop peripheral surface, and in the second anti-drop step, the gas injected from the second injection holes at the second support peripheral surface flows through a clearance between the second support peripheral surface and the printing surface of the printing medium facing the second support peripheral surface toward the second anti-drop peripheral surface to form a clearance between the second anti-drop peripheral surface and the printing surface of the printing medium facing the second anti-drop peripheral surface.

According to the first aspect of the present invention having the above-described configuration, in a zone from the first transfer part to the second transfer part via the first and second non-contact support members, the printing medium is transferred in a non-contact manner (in other words, transferred in a floating state). Thus, in some cases, by the influence of wind generated by the gas injected in the first and second transfer parts, the printing medium travels obliquely to drop from the first and second non-contact support members. In response to this, according to the first aspect of the present invention, the first anti-drop members are provided at the both ends of the first non-contact support member and the second anti-drop members are provided at the both ends of the second non-contact support member, and the first and second anti-drop peripheral surfaces of the first and second anti-drop members adjoin the first and second support peripheral surfaces of the first and second non-contact support members respectively. In this configuration, on the occurrence of oblique traveling of the printing medium, the printing medium is deviated from the first and second support peripheral surfaces of the first and second non-contact support members to the first and second anti-drop peripheral surfaces of the first and second anti-drop members respectively. During this time, the air injected from the first injection holes and the second injection holes formed at the first and second support peripheral surfaces of the first and second non-contact support members respectively flows through a clearance between each of the first and second support peripheral surfaces and the printing surface of the printing medium facing this first or second support peripheral surface toward each of the first and second anti-drop peripheral surfaces. As a result, a clearance is formed between each of the first and second anti-drop peripheral surfaces and the printing surface of the printing medium facing this first or second anti-drop peripheral surface. Specifically, the first and second anti-drop peripheral surfaces of the first and second anti-drop members allow the printing medium to be supported while providing the clearances from the printing surface of the printing medium deviated by the oblique traveling. In this way, it becomes possible to prevent drop of the printing medium from the non-contact support member supporting the printing medium in a non-contact manner.

According to the second aspect of the present invention, a drying apparatus comprises: a first transfer part including a plurality of first upper nozzles arranged in a horizontal direction above an elongated strip-shaped printing medium having a printing surface on which ink is adhered and a non-printing surface on the reverse side from the printing surface, and a plurality of first lower nozzles arranged in the horizontal direction below the printing medium, the first transfer part injecting gas onto the printing medium from the first upper nozzles and injecting gas onto the printing medium from the first lower nozzles, and transferring the printing medium toward one side of the horizontal direction with the printing surface pointed downward; a first non-contact support member including a first support peripheral surface to face the printing surface of the printing medium having been transferred from the first transfer part toward the one side, and a plurality of first injection holes opening at the first support peripheral surface, the first non-contact support member changing a traveling direction of the printing medium from a direction toward the one side of the horizontal direction to a downward direction while supporting the printing surface of the printing medium in a non-contact manner by injecting gas from the first injection holes onto the printing surface of the printing medium; a second non-contact support member including a second support peripheral surface to face the printing surface of the printing medium having been transferred downward from the first non-contact support member, and a plurality of second injection holes opening at the second support peripheral surface, the second non-contact support member changing a traveling direction of the printing medium from the downward direction to a direction toward the other side of the horizontal direction on the reverse side from the one side while supporting the printing surface of the printing medium in a non-contact manner by injecting gas from the second injection holes onto the printing surface of the printing medium; a second transfer part including a plurality of second upper nozzles arranged in the horizontal direction above the printing medium having been transferred toward the other side of the horizontal direction from the second non-contact support member, and a plurality of second lower nozzles arranged in the horizontal direction below the printing medium, the second transfer part injecting gas onto the printing medium from the second upper nozzles and injecting gas onto the printing medium from the second lower nozzles, and transferring the printing medium toward the other side of the horizontal direction with the printing surface pointed upward; a body frame supporting the first transfer part and the second transfer part; a first positioning part positioning the first non-contact support member relative to the body frame; and a second positioning part positioning the second non-contact support member relative to the body frame, wherein the first positioning part includes a first rotary support and a first position adjuster, and supports both ends of the first non-contact support member by the first rotary support and the first position adjuster, the first rotary support supports the first non-contact support member relative to the body frame in a manner allowing the first non-contact support member to rotate in each of a rotary direction about a first horizontal rotary axis parallel to the horizontal direction and a rotary direction about a first vertical rotary axis parallel to a vertical direction, the first position adjuster supports the first non-contact support member relative to the body frame in a manner allowing the position of the first non-contact support member relative to the body frame to be adjusted in each of the horizontal direction and the vertical direction, the second positioning part includes a second rotary support and a second position adjuster, and supports both ends of the second non-contact support member by the second rotary support and the second position adjuster, the second rotary support supports the second non-contact support member relative to the body frame in a manner allowing the second non-contact support member to rotate in each of a rotary direction about a second horizontal rotary axis parallel to the horizontal direction and a rotary direction about a second vertical rotary axis parallel to the vertical direction, and the second position adjuster supports the second non-contact support member relative to the body frame in a manner allowing the position of the second non-contact support member relative to the body frame to be adjusted in each of the horizontal direction and the vertical direction.

According to the second aspect of the present invention, a non-contact support member position adjusting method in a drying apparatus comprising: a first transfer part that transfers an elongated strip-shaped printing medium having a printing surface on which ink is adhered and a non-printing surface on the reverse side from the printing surface toward one side of a horizontal direction with the printing surface pointed downward; a first non-contact support member that changes a traveling direction of the printing medium having been transferred from the first transfer part toward the one side from a direction from a direction toward the one side of the horizontal direction to a downward direction; a second non-contact support member that changes a traveling direction of the printing medium having been transferred downward from the first non-contact support member from the downward direction to a direction toward the other side of the horizontal direction on the reverse side from the one side; and a second transfer part that transfers the printing medium having been transferred toward the other side of the horizontal direction from the second non-contact support member toward the other side of the horizontal direction with the printing surface pointed upward, the non-contact support member position adjusting method comprises: a first position adjusting step of adjusting the position of the first non-contact support member by a first positioning part positioning the first non-contact support member relative to a body frame supporting the first transfer part and the second transfer part; and a second position adjusting step of adjusting the position of the second non-contact support member by a second positioning part positioning the second non-contact support member relative to the body frame, wherein the first transfer part includes a plurality of first upper nozzles arranged in the horizontal direction above the printing medium and a plurality of first lower nozzles arranged in the horizontal direction below the printing medium, and injects gas onto the printing medium from the first upper nozzles and injects gas onto the printing medium from the first lower nozzles, the first non-contact support member includes a first support peripheral surface to face the printing surface of the printing medium having been transferred from the first transfer part toward the one side and a plurality of first injection holes opening at the first support peripheral surface, and supports the printing surface of the printing medium in a non-contact manner by injecting gas from the first injection holes onto the printing surface of the printing medium, the second non-contact support member includes a second support peripheral surface to face the printing surface of the printing medium having been transferred downward from the first non-contact support member and a plurality of second injection holes opening at the second support peripheral surface, and supports the printing surface of the printing medium in a non-contact manner by injecting gas from the second injection holes onto the printing surface of the printing medium, the second transfer part includes a plurality of second upper nozzles arranged in the horizontal direction above the printing medium having been transferred toward the other side of the horizontal direction from the second non-contact support member and a plurality of second lower nozzles arranged in the horizontal direction below the printing medium, and injects gas onto the printing medium from the second upper nozzles and injects gas onto the printing medium from the second lower nozzles, the first positioning part includes a first rotary support and a first position adjuster, and supports both ends of the first non-contact support member by the first rotary support and the first position adjuster, the first rotary support supports the first non-contact support member relative to the body frame in a manner allowing the first non-contact support member to rotate in each of a rotary direction about a first horizontal rotary axis parallel to the horizontal direction and a rotary direction about a first vertical rotary axis parallel to a vertical direction, the first position adjuster supports the first non-contact support member relative to the body frame in a manner allowing the position of the first non-contact support member relative to the body frame to be adjusted in each of the horizontal direction and the vertical direction, the second positioning part includes a second rotary support and a second position adjuster, and supports both ends of the second non-contact support member by the second rotary support and the second position adjuster, the second rotary support supports the second non-contact support member relative to the body frame in a manner allowing the second non-contact support member to rotate in each of a rotary direction about a second horizontal rotary axis parallel to the horizontal direction and a rotary direction about a second vertical rotary axis parallel to the vertical direction, and the second position adjuster supports the second non-contact support member relative to the body frame in a manner allowing the position of the second non-contact support member relative to the body frame to be adjusted in each of the horizontal direction and the vertical direction.

According to the second aspect of the present invention having the above-described configuration, the first and second positioning parts are provided for positioning the first and second non-contact support members respectively relative to the body frame. The first and second positioning parts include the first and second rotary supports and the first and second position adjusters respectively, and the respective both ends of the first and second non-contact support members are supported by the first rotary support and the first position adjuster and by the second rotary support and the second position adjuster respectively. In particular, the first and second rotary supports support the first and second non-contact support members respectively relative to the body frame in a manner allowing the first and second non-contact support members to rotate in the rotary directions about the first and second horizontal rotary axes parallel to the horizontal direction and the rotary directions about the first and second vertical rotary axes parallel to the vertical direction. The first and second position adjusters support the first and second non-contact support members respectively relative to the body frame in a manner allowing the positions of the first and second non-contact support members relative to the body frame to be adjusted in each of the horizontal direction and the vertical direction. Thus, it is possible to adjust the positions of the first and second non-contact support members relative to the body frame in each of the horizontal direction and the vertical direction. This achieves position adjustment of the first and second non-contact support members in such a manner that the printing medium will not drop from the first and second non-contact support members. As a result, it becomes possible to prevent drop of the printing medium from the non-contact support member supporting the printing medium in a non-contact manner.

As described above, according to the invention, it becomes possible to prevent drop of the printing medium from the non-contact support member supporting the printing medium in a non-contact manner, regarding a technique of drying a printing medium by injecting gas onto the printing medium.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
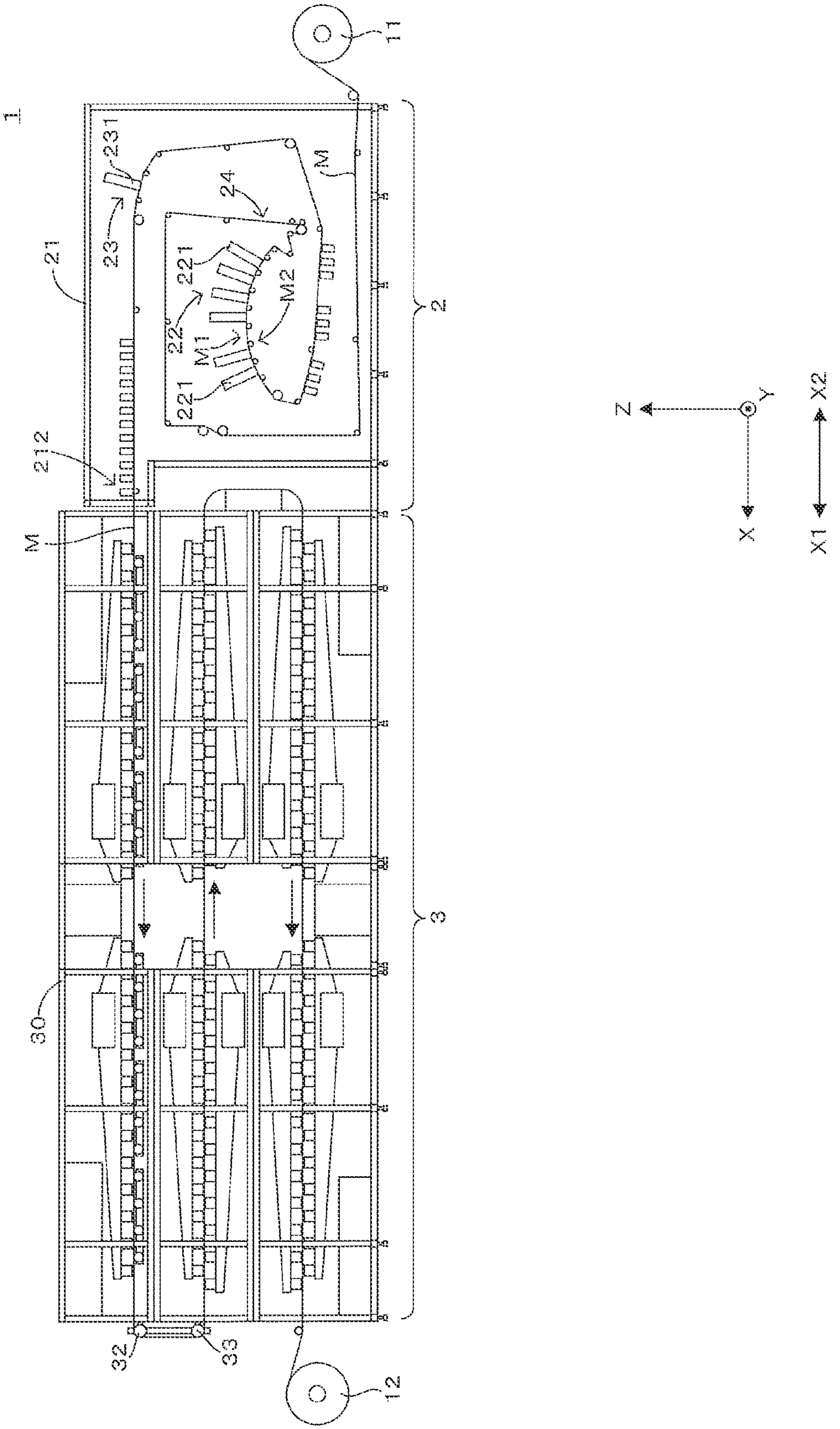
FIG. 1 is a front view schematically showing an example of a printing system including a drying apparatus according to the present invention.

FIG. 1 is a front view schematically showing an example of a printing system including a drying apparatus according to the present invention. In FIG. 1 and in the drawings referred to below, an X direction corresponding to a horizontal direction, a Y direction corresponding to a horizontal direction perpendicular to the X direction, and a Z direction corresponding to a vertical direction are shown as appropriate. An X1 side and an X2 side of the X direction are further shown as appropriate. The X1 side is a side of the X direction from a printing apparatus 2 toward a drying apparatus 3. The X2 side is a side of the X direction opposite to the X1 side.

As shown in FIG. 1, the printing system 1 has a configuration including the printing apparatus 2 and the drying apparatus 3 arranged side by side in this order in the X direction (arrangement direction). In the printing system 1, the printing apparatus 2 prints an image by ejecting aqueous ink by the inkjet method onto an elongated strip-shaped printing medium M while the printing medium M is transferred from a feed roll 11 to a wind-up roll 12 in a roll-to-roll process, and the drying apparatus 3 dries the printing medium M with the aqueous ink adhering on the printing medium M. A material of the printing medium M is a film made of oriented polypropylene (OPP) or polyethylene terephthalate (PET), for example. However, the material of the printing medium M is not limited to a film but may be paper, for example. The printing medium M has flexibility. In the following, a surface of both surfaces of the printing medium M on which an image is to be printed is called a front surface M1, and a surface on the opposite side to the front surface M1 is called a back surface M2 as appropriate.

The printing apparatus 2 includes a housing 21, a color printing part 22 arranged in the housing 21, a white printing part 23 arranged above the color printing part 22 in the housing 21, and a transfer part 24 that transfers the printing medium M using a plurality of rollers arranged in the housing 21. The color printing part 22, the white printing part 23, and the transfer part 24 are supported by the housing 21.

The color printing part 22 includes a plurality of (six) ejection heads 221 provided above the printing medium M transferred by the transfer part 24 and arranged in a traveling direction of the printing medium M. The ejection heads 221 include respective nozzles facing the front surface M1 of the printing medium M from above passing through positions below the ejection heads 221, and eject color inks (aqueous inks) of their respective colors from the nozzles by the inkjet method. The color inks mentioned herein mean inks of colors other than white, and include inks of cyan, magenta, yellow, and black, for example. In this configuration, the ejection heads 221 of the color printing part 22 eject the color inks from above onto the front surface M1 of the printing medium M passing through positions below the ejection heads 221, thereby printing a color image on the front surface M1 of the printing medium M.

The white printing part 23 includes a single ejection head 231 arranged above the printing medium M transferred by the transfer part 24. The ejection head 231 includes a nozzle facing the front surface M1 of the printing medium M from above passing through a position below the ejection head 231, and ejects white ink (aqueous ink) from the nozzle by the inkjet method. In this configuration, the ejection head 231 of the white printing part 23 ejects the white ink from above onto the front surface M1 of the printing medium M passing through a position below the ejection head 231, thereby printing a white image on the front surface M1 of the printing medium M. Then, the printing medium M with the color image printed by the color printing part 22 and the white image printed by the white printing part 23 is unloaded by the transfer part 24 through an outlet 212 of the housing 21 and moves toward the drying apparatus 6.

Figure 2:
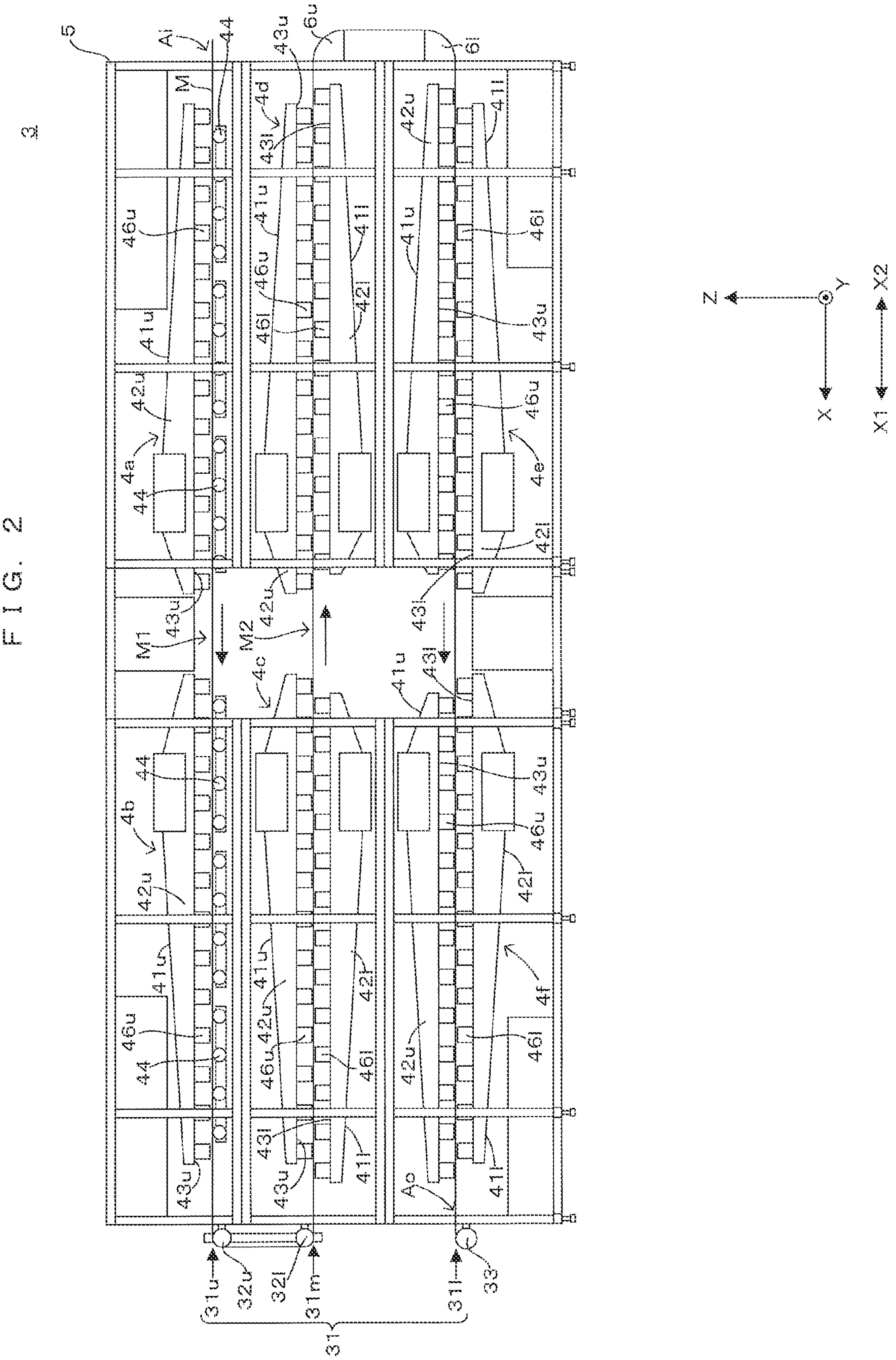
FIG. 2 is a front view schematically showing the drying apparatus according to the present invention.

FIG. 2 is a front view schematically showing the drying apparatus according to the present invention. The drying apparatus 3 is to dry the printing medium M while folding the printing medium M properly in the X direction and transferring the printing medium M. The drying apparatus 3 includes a housing 5 (drying furnace) arranged on the X1 side relative to the housing 21 of the printing apparatus 2. The housing 5 has a rectangular parallelepiped shape extended in the X direction. In the X direction, an inlet Ai is provided to the housing 5 on the X2 side (on the side of the printing apparatus 2), and an outlet Ao is provided to the housing 5 on the X1 side (on the opposite side to the printing apparatus 2). After the printing medium M is unloaded through the outlet 212 of the printing apparatus 2, the printing medium M is loaded into the housing 5 (drying furnace) through the inlet Ai. After the printing medium M is dried in the housing 5, the printing medium M is unloaded to the outside of the housing 5 through the outlet Ao.

The drying apparatus 3 includes a transfer part 31 for transfer of the printing medium M. The transfer part 31 transfers the printing medium M from the inlet A to the outlet Ao. The transfer part 31 includes an upper-stage transfer part 31*u* that transfers the printing medium M from the X2 side toward the X1 side, a middle-stage transfer part 31*m* that transfers the printing medium M from the X1 side toward the X2 side, and a lower-stage transfer part 31*l* that transfers the printing medium M from the X2 side toward the X1 side. The middle-stage transfer part 31*m* is arranged under the upper-stage transfer part 31*u*, and the lower-stage transfer part 31*l* is arranged under the middle-stage transfer part 31*m*.

In the upper-stage transfer part 31*u*, the printing medium M is transferred toward the X1 side with the front surface M1 pointed upward and the back surface M2 pointed downward. The transfer part 31 includes a roller 32*u* and a roller 32*l* arranged one above the other on the X1 side relative to the upper-stage transfer part 31*u* and the middle-stage transfer part 31*m*. The roller 32*u* and the roller 32*l* are rotatably mounted on the housing 5. The upper roller 32*u* is located at a height corresponding to the upper-stage transfer part 31*u*. The lower roller 32*l* is located at a height corresponding to the middle-stage transfer part 31*m*.

The upper roller 32*u* comes into contact with the back surface M2 of the printing medium M having been transferred toward the X1 side from the upper-stage transfer part 31*u* to change a traveling direction of the printing medium M from a direction toward the X1 side to a downward direction. The lower roller 32*l* comes into contact with the back surface M2 of the printing medium M having been transferred from the upper roller 32*u* to change a traveling direction of the printing medium M from the downward direction to a direction toward the X2 side. Specifically, the front surface M1 and the back surface M2 of the printing medium M is reversed up and down by the roller 32*u* and the roller 32*l*. Then, the printing medium M reversed up and down goes into the middle-stage transfer part 31*m* with the back surface M2 pointed upward and the front surface M1 pointed downward.

In response to this, the middle-stage transfer part 31*m* transfers the printing medium M toward the X2 side with the back surface M2 pointed upward and the front surface M1 pointed downward. The transfer part 31 further includes an air turn bar 6*u* and an air turn bar 6*l* arranged one above the other on the X2 side relative to the middle-stage transfer part 31*m* and the lower-stage transfer part 31*l*. The air turn bar 6*u* and the air turn bar 6*l* are mounted on the housing 5. The upper air turn bar 6*u* is located at a height corresponding to the middle-stage transfer part 31*m*. The lower air turn bar 6*l* is located at a height corresponding to the lower-stage transfer part 31*l*.

The upper air turn bar 6*u* supports the back surface M2 of the printing medium M having been transferred from the middle-stage transfer part 31*m* toward the X2 side while injecting air onto the back surface M2, and changes a traveling direction of the printing medium M from the direction toward the X2 side to a downward direction. The lower air turn bar 6*l* supports the back surface M2 of the printing medium M having been transferred from the upper air turn bar 6*u* while injecting air onto the back surface M2, and changes a traveling direction of the printing medium M from the downward direction to a direction toward the X1 side. Specifically, the air turn bars 6*u* and 6*l* reverse the front surface M1 and the back surface M2 of the printing medium M up and down. The printing medium M having been reversed up and down in this way goes into the lower-stage transfer part 31*l* with the front surface M1 pointed upward and the back surface M2 pointed downward.

In response to this, the lower-stage transfer part 31*l* transfers the printing medium M toward the X1 side with the front surface M1 pointed upward and the back surface M2 pointed downward. An unloading roller 33 is provided on the X1 side relative to the lower-stage transfer part 31*l*. The unloading roller 33 is rotatably mounted on the housing 5 and is located at a height corresponding to the lower-stage transfer part 31*l*. The unloading roller 33 supports the printing medium M by coming into contact with the back surface M2 of the printing medium M having been transferred toward the X1 side and unloaded through the outlet Ao by the lower-stage transfer part 31*l*.

The upper-stage transfer part 31*u* includes two blow-drying parts 4*a* and 4*b* arranged in the X direction between the inlet Ai and the roller 32*u*. The upper-stage transfer part 31*u* dries the printing medium M while transferring the printing medium M toward the X1 side using the blow-drying parts 4*a* and 4*b*.

The blow-drying part 4*a* includes a blower unit 41*u* arranged above the printing medium M. The blower unit 41*u* includes a blower chamber 42*u* provided above the printing medium M and extended in the X direction. The blower chamber 42*u* receives supply of hot air (blow of air of equal to or greater than 60 degrees in temperature) generated by heating air using a heater provided outside the printing system 1. The blower chamber 42*u* has a lower surface functioning as a nozzle arrangement plane 43*u* facing the front surface M1 (upper surface) from above of the printing medium M pointed upward. The nozzle arrangement plane 43*u* is a plane parallel to the X direction and perpendicular to the Z direction. The blower unit 41*u* includes a plurality of nozzles 46*u* arranged on the nozzle arrangement plane 43*u* at a predetermined pitch in the X direction. In this way, the nozzles 46*u* are arranged side by side between the nozzle arrangement plane 43*u* and the front surface M1 of the printing medium M and face the front surface M1 of the printing medium M. Each of the nozzles 46*u* communicates with the blower chamber 42*u*. The hot air supplied to the blower chamber 42*u* is injected from the nozzle 46*u* onto the front surface M1 of the printing medium M to dry the printing medium M.

The blow-drying part 4*a* further includes a plurality of rollers 44 arranged below the printing medium M. The rollers 44 are arranged at the predetermined pitch in a traveling direction (X direction) of the printing medium M. Each of the rollers 44 has a peripheral surface to come into contact with the back surface M2 (lower surface) of the printing medium M from below. Each of the rollers 44 supports the printing medium M from below while being driven to rotate by the printing medium M about a rotary axis parallel to the Y direction (a width direction of the printing medium M). The roller 44 is provided with a fine groove to cause air to escape easily from between the printing medium M and the peripheral surface of the roller 44.

The nozzle 46*u* faces a range from above between two rollers 44 adjacent to each other in the X direction. The roller 44 faces a range from below between two nozzles 46*u* above the roller 44 and adjacent to each other in the X direction. Specifically, in the X direction, the nozzles 46*u* and the rollers 44 are arranged alternately side by side at a pitch half the predetermined pitch and are arranged alternately one by one in the X direction in a plan view taken from the Z direction. In other words, the nozzles 46*u* and the rollers 44 are arranged in a staggered pattern in the X direction.

The blow-drying part 4*b* is arranged downstream of a traveling direction of the printing medium M from the blow-drying part 4*a*. Like the blow-drying part 4*a*, the blow-drying part 4*b* includes a blower unit 41*u* and a plurality of rollers 44 arranged above and below the printing medium M respectively. In the blow-drying part 4*b*, while the rollers 44 support the back surface M2 of the printing medium M from below, hot air is injected onto the front surface M1 of the printing medium M from a plurality of nozzles 46*u* of the blower unit 41*u* to dry the printing medium M.

The middle-stage transfer part 31*m* includes two blow-drying parts 4*c* and 4*d* arranged in the X direction between the roller 32*l* and the air turn bar 6*u*. The middle-stage transfer part 31*m* dries the printing medium M while transferring the printing medium M toward the X2 side using the blow-drying parts 4*c* and 4*d*.

The blow-drying part 4*c* includes a blower unit 41*u* and a blower unit 41*l* arranged above and below the printing medium M respectively. The upper blower unit 41*u* includes a blower chamber 42*u* provided above the printing medium M and extended in the X direction. The blower chamber 42*u* receives supply of the hot air described above. The blower chamber 42*u* has a lower surface functioning as a nozzle arrangement plane 43*u* facing the back surface M2 (upper surface) from above of the printing medium M pointed upward. The nozzle arrangement plane 43*u* is a plane parallel to the X direction and perpendicular to the Z direction. The blower unit 41*u* further includes a plurality of nozzles 46*u* arranged on the nozzle arrangement plane 43*u* at a predetermined pitch in the X direction. In this way, the nozzles 46*u* are arranged side by side between the nozzle arrangement plane 43*u* and the back surface M2 of the printing medium M and face the back surface M2 of the printing medium M. Each of the nozzles 46*u* communicates with the blower chamber 42*u*. The hot air supplied to the blower chamber 42*u* is injected from the nozzle 46*u* onto the back surface M2 of the printing medium M.

The lower blower unit 41*l* includes a blower chamber 42*l* provided below the printing medium M and extended in the X direction. The blower chamber 42*l* receives supply of the hot air described above. The blower chamber 42*l* has an upper surface functioning as a nozzle arrangement plane 43*l* facing the front surface M1 (lower surface) from below of the printing medium M pointed downward. The nozzle arrangement plane 43*l* is a plane parallel to the X direction and perpendicular to the Z direction. The blower unit 41*l* further includes a plurality of nozzles 46*l* arranged on the nozzle arrangement plane 43*l* at the predetermined pitch in the X direction. In this way, the nozzles 46*l* are arranged side by side between the nozzle arrangement plane 43*l* and the front surface M1 of the printing medium M and face the front surface M1 of the printing medium M. Each of the nozzles 46*l* communicates with the blower chamber 42*l*. The hot air supplied to the blower chamber 42*l* is injected from the nozzle 46*l* onto the front surface M1 of the printing medium M.

The upper nozzle 46*u* faces a range from above between two lower nozzles 46*l* adjacent to each other in the X direction. The lower nozzle 46*l* faces a range from below between two upper nozzles 46*u* adjacent to each other in the X direction. Specifically, in the X direction, the upper nozzles 46*u* and the lower nozzles 46*l* are arranged alternately side by side at a pitch half the predetermined pitch and are arranged alternately one by one in the X direction in a plan view taken from the Z direction. In other words, the nozzles 46*u* and the nozzles 46*l* are arranged in a staggered pattern in the X direction.

The blow-drying part 4*d* is arranged downstream of a traveling direction of the printing medium M from the blow-drying part 4*c*. Like the blow-drying part 4*c*, the blow-drying part 4*d* includes a blower unit 41*u* and a blower unit 41*l* between which the printing medium M is sandwiched from the Z direction. In the blow-drying part 4*d*, the blower unit 41*u* injects the hot air from above onto the back surface M2 of the printing medium M and the blower unit 41*l* injects the hot air from below onto the front surface M1 of the printing medium M, thereby drying the printing medium M.

The lower-stage transfer part 31*l* includes two blow-drying parts 4*e* and 4*f* arranged in the X direction between the air turn bar 6*l* and the unloading roller 33. The lower-stage transfer part 31*l* dries the printing medium M while transferring the printing medium M toward the X1 side using the blow-drying parts 4*e* and 4*f*.

Like the blow-drying part 4*c*, the blow-drying part 4*e* includes a blower unit 41*u* and a blower unit 41*l* between which the printing medium M is sandwiched from the Z direction. In the blow-drying part 4*e*, the blower unit 41*u* injects the hot air from above onto the front surface M1 of the printing medium M and the blower unit 41*l* injects the hot air from below onto the back surface M2 of the printing medium M, thereby drying the printing medium M.

The blow-drying part 4*f* is arranged downstream of a traveling direction of the printing medium M from the blow-drying part 4*e*. Like the blow-drying part 4*c*, the blow-drying part 4*f* includes a blower unit 41*u* and a blower unit 41*l* between which the printing medium M is sandwiched from the Z direction. In the blow-drying part 4*f*, the blower unit 41*u* injects the hot air from above onto the front surface M1 of the printing medium M and the blower unit 41*l* injects the hot air from below onto the back surface M2 of the printing medium M, thereby drying the printing medium M.

Figure 3:
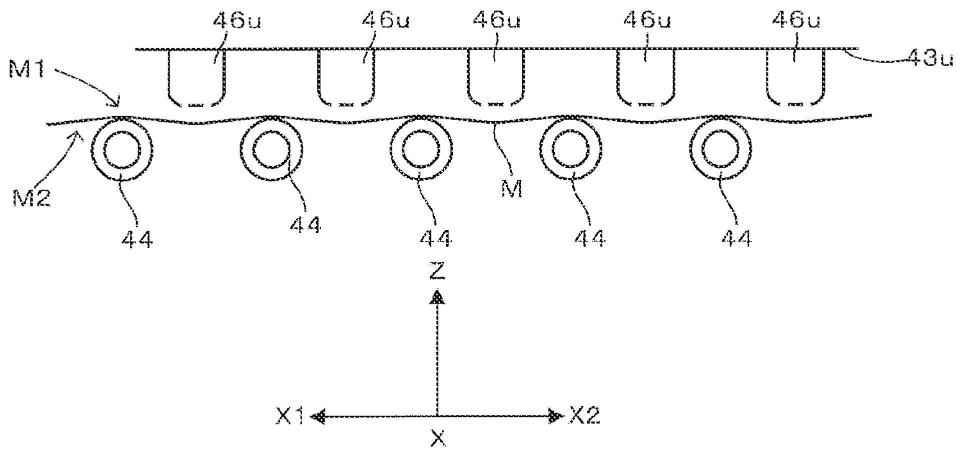
FIG. 3 is a schematic view showing the blow-drying part of the upper-stage transfer part in a partially enlarged manner.

FIG. 3 is a schematic view showing the blow-drying part of the upper-stage transfer part in a partially enlarged manner. As shown in FIG. 3, in the upper-stage transfer part 31*u* of the drying apparatus 3 described above, the printing medium M is pressed downward at a position facing the nozzle 46*u* by the hot air injected from this nozzle 46*u* to be deflected downward from the upper end of the roller 44, and is supported on the roller 44 at a position facing this roller 44. Thus, the printing medium M is transferred in the horizontal direction X while undulating between the upper ends of the rollers 44 and positions below the upper ends.

Figure 4:
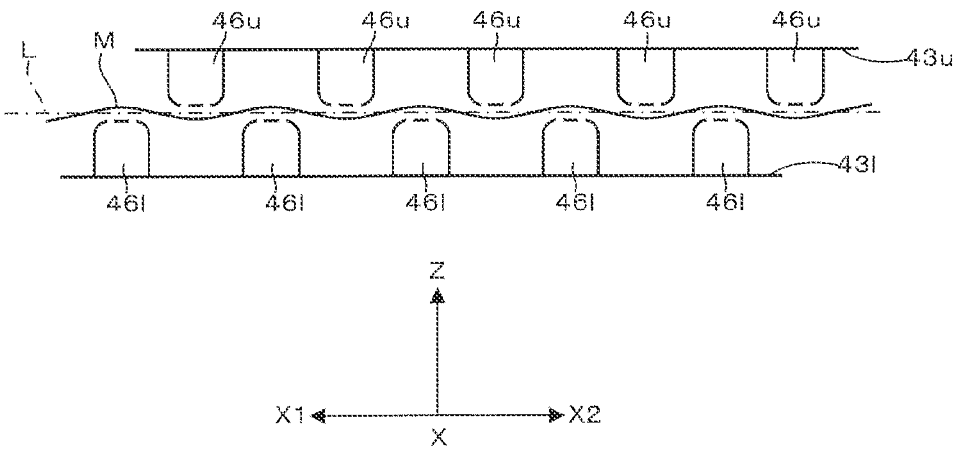
FIG. 4 is a schematic view showing the blow-drying part of each of the middle-stage transfer part and the lower-stage transfer part in a partially enlarged manner.

FIG. 4 is a schematic view showing the blow-drying part of each of the middle-stage transfer part and the lower-stage transfer part in a partially enlarged manner. As shown in FIG. 4, in the middle-stage transfer part 31*m* or the lower-stage transfer part 31*l* of the drying apparatus 3 described above, the printing medium M is pressed downward at a position facing the upper nozzle 46*u* by the hot air injected from this nozzle 46*u* to be deflected downward from a transfer center line L, and is pressed upward at a position facing the lower nozzle 46*l* by the hot air injected from this nozzle 46*l* to be deflected upward from the transfer center line L. The transfer center line L mentioned herein is a virtual horizontal straight line from which the nozzle 46*u* and the nozzle 46*l* are separated by the same distance in the vertical direction Z. Thus, the printing medium M is transferred in the horizontal direction X while undulating between positions above and positions below the transfer center line L.

Figure 5:
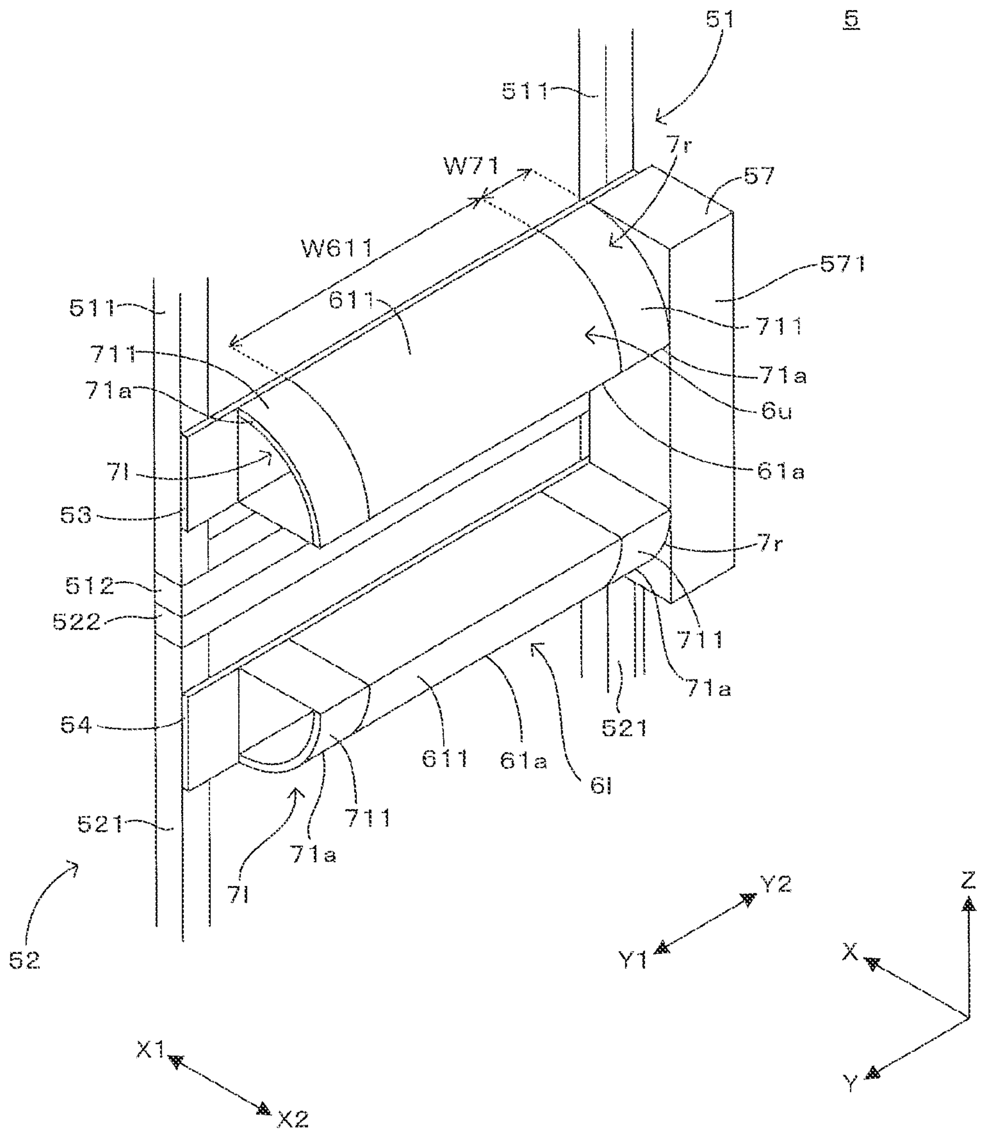
FIG. 5 is a perspective view schematically showing the air turn bar provided in the drying apparatus and peripheral structures of this air turn bar.
Figure 6:
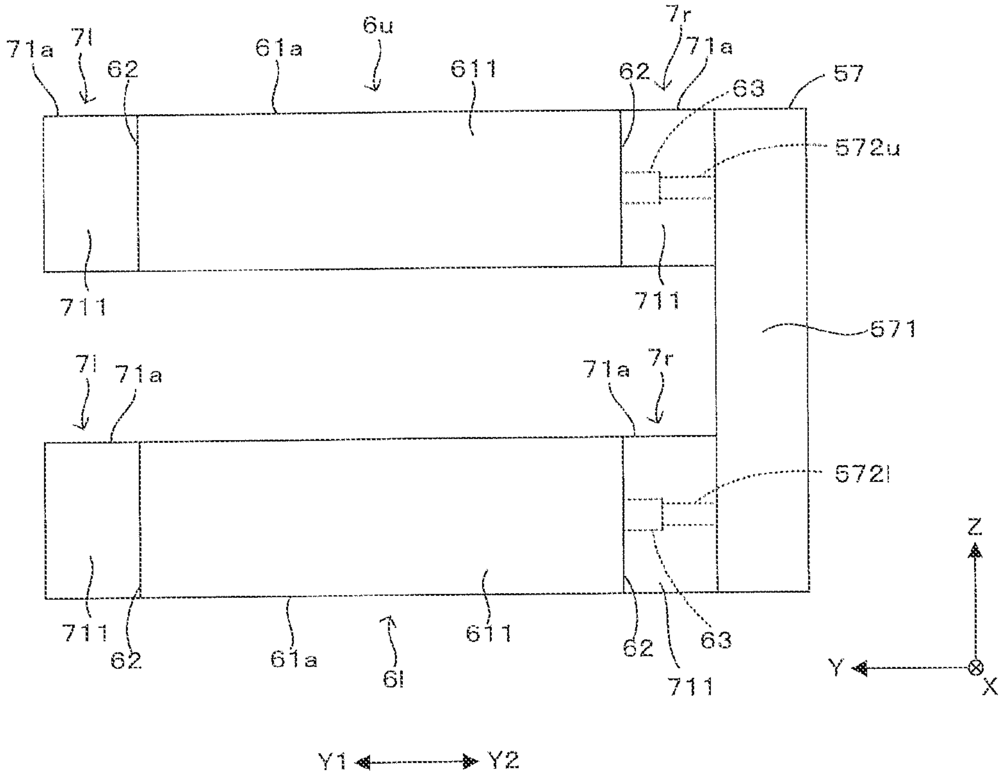
FIG. 6 is a side view schematically showing the air turn bar provided in the drying apparatus and peripheral structures of this air turn bar.

FIG. 5 is a perspective view schematically showing the air turn bar provided in the drying apparatus and peripheral structures of this air turn bar. FIG. 6 is a side view schematically showing the air turn bar provided in the drying apparatus and peripheral structures of this air turn bar. In the following, a Y1 side and a Y2 side of the Y direction like those given in FIGS. 5 and 6 are shown as appropriate. The Y1 side and the Y2 side are pointed oppositely to each other.

As described above, the air turn bar 6*u* and the air turn bar 6*l* are mounted on the housing 5 of the drying apparatus 3. The housing 5 includes a frame 51 and a frame 52 stacked on each other in the Z direction. The air turn bar 6*u* is mounted on the upper frame 51. The air turn bar 6*l* is mounted on the lower frame 52.

The frame 51 includes two columnar members 511 spaced from each other in the Y direction and provided parallel to each other in the Z direction, and a beam member 512 provided parallel to the Y direction and connecting the respective lower ends of the two columnar members 511. The housing 5 further includes a mounting plate 53 provided parallel to the Y direction and bridged between the two columnar members 511. The air turn bar 6*u* is mounted on the mounting plate 53. A configuration for mounting the air turn bar 6*u* on the mounting plate 53 is illustrated in a simplified manner in FIG. 5 and particulars of this configuration will be described later.

The frame 52 includes two columnar members 521 spaced from each other in the Y direction and provided parallel to each other in the Z direction, and a beam member 522 provided parallel to the Y direction and connecting the respective lower ends of the two columnar members 521.

The housing 5 further includes a mounting plate 54 provided parallel to the Y direction and bridged between the two columnar members 521. The air turn bar **6*l* is mounted on the mounting plate 54. A configuration for mounting the air turn bar 6*l* on the mounting plate 54 is illustrated in a simplified manner in FIG. 5** and particulars of this configuration will be described later.

Figure 8:
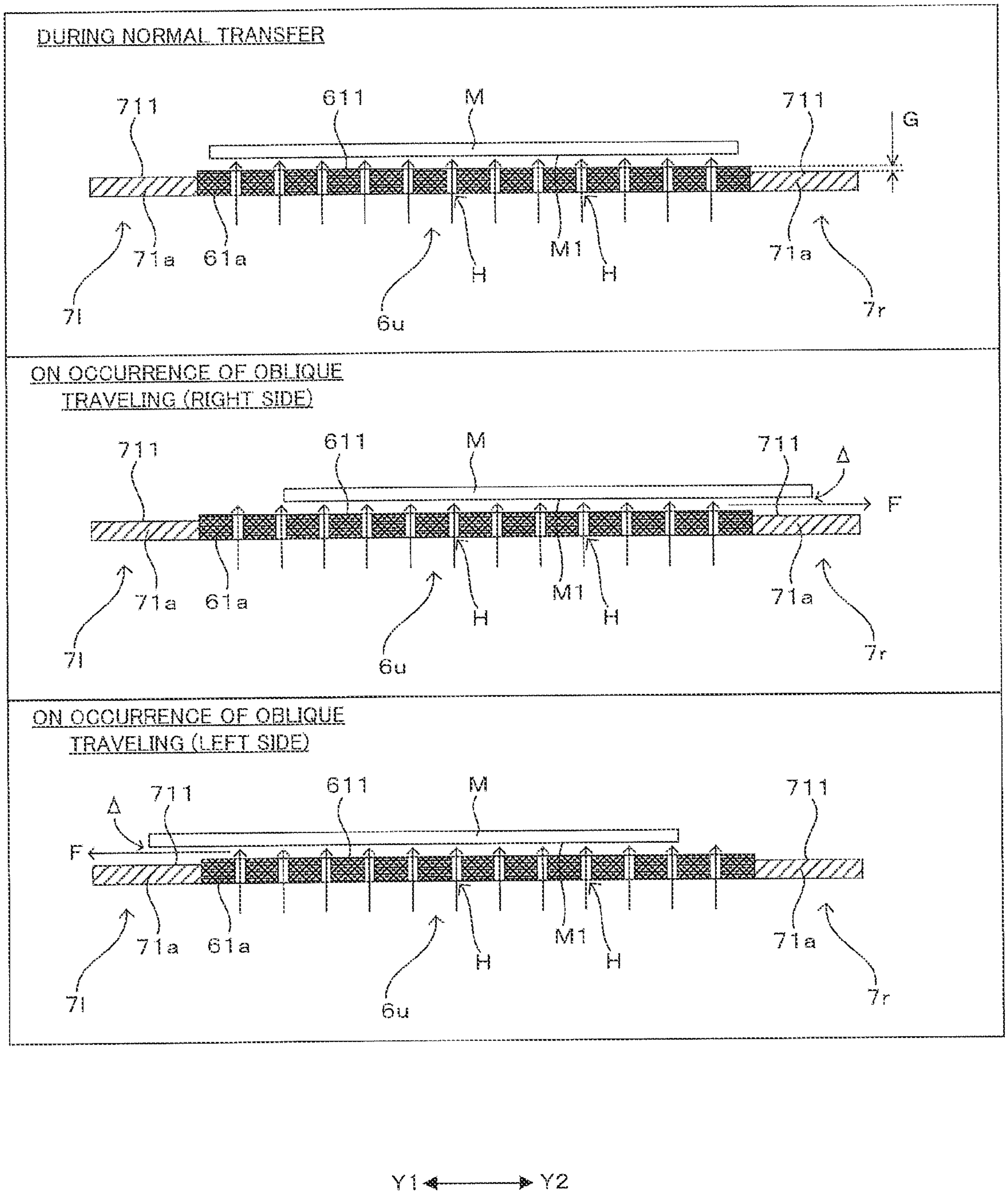
FIG. 8 schematically shows the function of the anti-drop member.

Each of the air turn bars **6*u* and 6*l* includes a bar body 61*a* having a sector shape as viewed from the Y direction. The bar body 61*a* includes a support peripheral surface 611. The support peripheral surface 611 of the bar body 61*a* is a partial cylindrical surface having a center parallel to the Y direction and has a predetermined width W611 in the Y direction. The support peripheral surface 611 is provided with a plurality of air injection holes H opening (FIG. 8). The support peripheral surface 611 faces the front surface M1 of the printing medium M and air is injected from each of the air injection holes H opening at the support peripheral surface 611 toward the front surface M1. By this injection of air, a clearance is ensured between the support peripheral surface 611 and the front surface M1 of the printing medium M to support the printing medium M in a non-contact manner by the support peripheral surface 611**.

The printing medium M supported in this way by the support peripheral surface 611 is bent along the support peripheral surface 611. By doing so, a traveling direction of the printing medium M is changed 90 degrees along the support peripheral surface 611. Specifically, a traveling direction of the printing medium M is changed along the support peripheral surface 611 of the air turn bar **6*u* from a direction toward the X2 side to a downward direction. Furthermore, a traveling direction of the printing medium M is changed along the support peripheral surface 611 of the air turn bar 6*l*** from the downward direction to a direction toward the X1 side.

Each of the air turn bars **6*u* and 6*l* includes side wall members 62 provided at both ends of the bar body 61*a* in the Y direction. The side wall members 62 are flat plates arranged in such a manner as to be perpendicular to the Y direction. Each of the air turn bars 6*u* and 6*l* further includes a pipe 63 for feeding air into the bar body 61*a*. The pipe 63 projects toward the Y2 side from the side wall member 62 on the Y2 side of the two side wall members 62**.

An anti-drop member **7*r* and an anti-drop member 7*l* are mounted on both ends of the air turn bar 6*u* in the Y direction. Each of the anti-drop members 7*r* and 7*l* includes an anti-drop body 71*a* having an arc-like shape as viewed from the Y direction. The anti-drop body 71*a* includes an anti-drop peripheral surface 711. The anti-drop peripheral surface 711 of the anti-drop body 71*a* is a partial cylindrical surface having a center parallel to the Y direction and has a width W71 shorter than the width W611 in the Y direction. No air injection hole H opens at the anti-drop peripheral surface 711. The cylindrical shape of the support peripheral surface 611 of the air turn bar 6*u* and the cylindrical shape of the anti-drop peripheral surface 711 of each of the anti-drop members 7*r* and 7*l* have the same center. Meanwhile, as viewed from the Y direction, a distance from this center to the support peripheral surface 611 (the radius of the cylindrical shape) is slightly longer than a distance from this center to the anti-drop peripheral surface 711 (the radius of the cylindrical shape). Specifically, the support peripheral surface 611 projects further than the anti-drop peripheral surface 711**.

As described above, the anti-drop member **7*l* is provided that adjoin the air turn bar 6*u* from the Y1 side of the Y direction and the anti-drop member 7*r* is provided that adjoin the air turn bar 6*u* from the Y2 side of the Y direction. Likewise, the anti-drop member 7*l* is provided that adjoin the air turn bar 6*l* from the Y1 side of the Y direction and the anti-drop member 7*r* is provided that adjoin the air turn bar 6*l*** from the Y2 side of the Y direction.

An air supplier 57 is arranged on the Y2 side of the Y direction relative to the air turn bars **6*u* and 6*l*. The air supplier 57 includes an air supply body 571 extended in the Z direction in such a manner as to face the air turn bars 6*u* and 6*l* from the Y2 side, a duct 572*u* projecting toward the Y1 side from an upper end portion of the air supply body 571, and a duct 572*l* projecting toward the Y1 side from a lower end portion of the air supply body 571. The duct 572*u* and the pipe 63 of the air turn bar 6*u* are connected to each other to supply air from the air supply body 571 to the bar body 61*a* of the air turn bar 6*u* through the duct 572*u* and the pipe 63. The air supplied in this way from the air supplier 57 to the air turn bar 6*u* is injected through the air injection hole H opening at the support peripheral surface 611 of the air turn bar 6*u*. Likewise, the duct 572*l* and the pipe 63 of the air turn bar 6*l* are connected to each other to supply air from the air supply body 571 to the bar body 61*a* of the air turn bar 6*l* through the duct 572*l* and the pipe 63. The air supplied in this way from the air supplier 57 to the air turn bar 6*l* is injected from the air injection hole H opening at the support peripheral surface 611 of the air turn bar 6*l***.

A space is provided between the air turn bar **6*u* and the air supply body 571 of the air supplier 57 in the Y direction. The anti-drop member 7*r* on the Y2 side of the two anti-drop members 7*r* and 7*l* provided to the air turn bar 6*u* is arranged in this space. Likewise, a space is provided between the air turn bar 6*l* and the air supplier 57 in the Y direction. The anti-drop member 7*r* on the Y2 side of the two anti-drop members 7*r* and 7*l* provided to the air turn bar 6*l*** is arranged in this space.

Figure 7A:
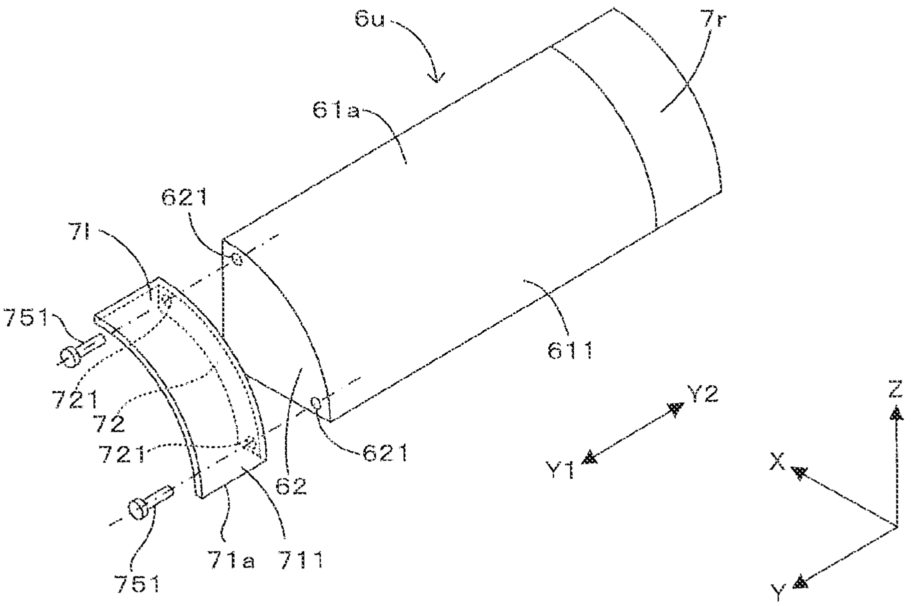
FIG. 7A is a perspective view schematically showing a configuration for mounting the anti-drop member to the air turn bar.

FIG. 7A is a perspective view schematically showing a configuration for mounting the anti-drop member to the air turn bar. As the anti-drop members **7*r* and 7*l* are both mounted on the air turn bars 6*u* and 6*l* by a configuration common between the air turn bars 6*u* and 6*l*, the configuration mentioned herein is for mounting on the air turn bar 6*u*. As described above, the side wall members 62 are provided at the both ends of the bar body 61*a* of the air turn bar 6*u* in the Y direction. Each of the side wall members 62 is provided in such a manner as to be perpendicular to the Y direction and has a sector shape as viewed from the Y direction. The side wall member 62 is provided with a plurality of screw holes 621** in the Y direction.

The anti-drop member **7*l* includes a mounting flange 72 provided at one end of the anti-drop body 71*a* on the side of the air turn bar 6*u* in the Y direction. The mounting flange 72 is provided in such a manner as to project inward from the anti-drop body 71*a* as viewed from the Y direction. A plurality of through holes 721 penetrate the mounting flange 72** in the Y direction.

By causing the mounting flange 72 of the anti-drop member **7*l* to face a peripheral portion having a sector shape of the side wall member 62 of the air turn bar 6*u* from the Y direction, the plurality of through holes 721 of the anti-drop member 7*l* and the plurality of screw holes 621 of the air turn bar 6*u* face respectively. Then, while bolts 751 are inserted into the through holes 721 and the screw holes 621 facing each other in this way, the bolts 751 are threadedly engaged with the screw holes 621. By doing so, it becomes possible to fasten the anti-drop member 7*l* to the air turn bar 6*u***.

The anti-drop member 7r and the air turn bar 6u are fastened to each other by the same configuration. While the anti-drop member 7r is fastened to the air turn bar 6u, the side wall member 62 of the air turn bar 6u projects inward further than the mounting flange 72 of the anti-drop member 7r. Meanwhile, the pipe 63 shown in FIG. 6 is arranged at the side wall member 62 at an inward position relative to the mounting flange 72 of the anti-drop member 7r. By doing so, interference between the pipe 63 and the anti-drop member 7r is prevented.

Figure 7B:
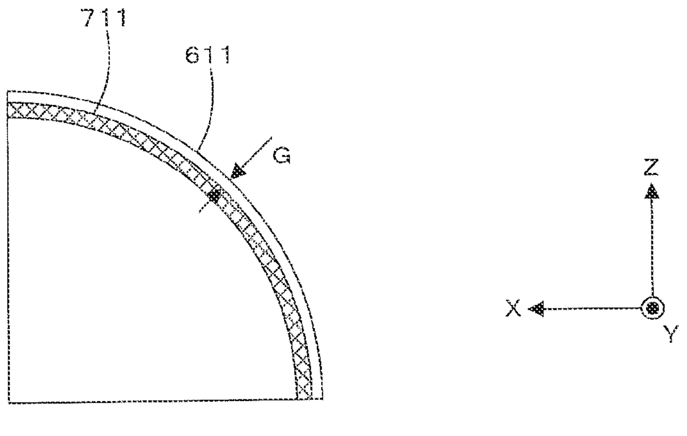
FIG. 7B schematically shows a relationship between the support peripheral surface of the air turn bar and the anti-drop peripheral surface of the anti-drop member fastened to each other.

FIG. 7B schematically shows a relationship between the support peripheral surface of the air turn bar and the anti-drop peripheral surface of the anti-drop member fastened to each other. As shown in FIG. 7B, while the fastened state is provided by the configuration shown in FIG. 7A, the support peripheral surface 611 projects further than the anti-drop peripheral surface 711 by a projection amount G as viewed from the Y direction.

FIG. 8 schematically shows the function of the anti-drop member. As the function is common between the anti-drop members 7l and 7r provided to the air turn bar 6u and the anti-drop members 7l and 7r provided to the air turn bar 6l, the description given herein is about the function of the former anti-drop members.

As shown in a row "during normal transfer" in FIG. 8, when the printing medium M is transferred without causing oblique traveling, both ends of the printing medium M fall within a range between both ends of the support peripheral surface 611 of the air turn bar 6u in the Y direction so the front surface M1 of the printing medium M entirely faces the support peripheral surface 611. The printing medium M is transferred while a clearance is ensured between the support peripheral surface 611 and the front surface M1 of the printing medium M by air injected onto the front surface M1 of the printing medium M from the air injection hole H opening at the support peripheral surface 611.

As shown in a row "on the occurrence of oblique traveling (right side)" in FIG. 8, when the printing medium M is transferred while traveling obliquely to the right side, an end portion on the Y2 side of the front surface M1 of the printing medium M in the Y direction projects toward the Y2 side further than the support peripheral surface 611 of the air turn bar 6u and faces the anti-drop peripheral surface 711 of the anti-drop member 7r. On the other hand, a portion of the front surface M1 of the printing medium M other than this end portion faces the support peripheral surface 611 and receives air injected from the air injection hole H. By doing so, the air injected onto the front surface M1 of the printing medium M from the air injection hole H partially forms an airflow F moving toward the Y2 side of the Y direction. By the airflow F, a clearance Δ is formed between the front surface M1 of the printing medium M and the anti-drop peripheral surface 711 of the anti-drop member 7r. As described above, a clearance is ensured by the air injected from the air injection hole H between the portion of the front surface M1 of the printing medium M facing the support peripheral surface 611 and the support peripheral surface 611.

As shown in a row "on the occurrence of oblique traveling (left side)" in FIG. 8, when the printing medium M is transferred while traveling obliquely to the left side, an end portion on the Y1 side of the front surface M1 of the printing medium M in the Y direction projects toward the Y1 side further than the support peripheral surface 611 of the air turn bar 6u and faces the anti-drop peripheral surface 711 of the anti-drop member 7l. On the other hand, a portion of the front surface M1 of the printing medium M other than this end portion faces the support peripheral surface 611 and receives air injected from the air injection hole H. By doing so, the air injected onto the front surface M1 of the printing medium M from the air injection hole H partially forms an airflow F moving toward the Y1 side of the Y direction. By the airflow F, a clearance Δ is formed between the front surface M1 of the printing medium M and the anti-drop peripheral surface 711 of the anti-drop member 7l. As described above, a clearance is ensured by the air injected from the air injection hole H between the portion of the front surface M1 of the printing medium M facing the support peripheral surface 611 and the support peripheral surface 611.

In the above-described drying apparatus 3, in a zone from the middle-stage transfer part 31m (first transfer part) to the lower-stage transfer part 31l (second transfer part) via the air turn bars 6u and 6l (first/second non-contact support member) (specifically, in a zone after passage through the roller 32l to arrival at the unloading roller 33), the printing medium M is transferred in a non-contact manner (in other words, transferred in a floating state). Thus, in some cases, by the influence of wind generated by air (gas) injected in the middle-stage transfer part 31m and in the lower-stage transfer part 31l, the printing medium M travels obliquely to drop in the Y direction from the air turn bars 6u and 6l. In response to this, according to the embodiment described using FIGS. 5 to 8, the anti-drop members 7l and 7r (first/second anti-drop member) are provided to each of the air turn bars 6u and 6l, and the respective anti-drop peripheral surfaces 711 (first/second anti-drop peripheral surface) of the anti-drop members 7l and 7r adjoin the support peripheral surface 611 (first/second support peripheral surface) of each of the air turn bars 6u and 6l. In this configuration, on the occurrence of oblique traveling of the printing medium M, the printing medium M is deviated from the support peripheral surface 611 of each of the air turn bars 6u and 6l to the anti-drop peripheral surface 711 of the anti-drop member 7l or 7r. During this time, the air injected from the injection holes H (first injection holes/second injection holes) formed at the support peripheral surface 611 of each of the air turn bars 6u and 6l flows through a clearance between the support peripheral surface 611 and the front surface M1 (printing surface) of the printing medium M facing this support peripheral surface 611 toward the anti-drop peripheral surface 711 ("on the occurrence of oblique traveling (right side)" and "on the occurrence of oblique traveling (left side)" in FIG. 8). As a result, the clearance Δ is formed between the anti-drop peripheral surface 711 and the front surface M1 of the printing medium M facing this anti-drop peripheral surface 711. Specifically, the anti-drop peripheral surface 711 of each of the anti-drop members 7l and 7r allows the printing medium M to be supported while providing the clearance Δ from the front surface M1 of the printing medium M deviated by the oblique traveling. In this way, it becomes possible to prevent drop of the printing medium M from the air turn bars 6u and 6l supporting the printing medium M in a non-contact manner.

In a side view from the Y direction (width direction), the support peripheral surface 611 projects further than the anti-drop peripheral surface 711. This generates the smooth airflow F flowing from the support peripheral surface 611 toward the anti-drop peripheral surface 711 to form the clearance Δ reliably between the anti-drop peripheral surface 711 and the front surface M1 of the printing medium M. This allows the printing medium M deviated by oblique traveling to be supported using the anti-drop peripheral surface 711 while the clearance Δ is formed from the anti-drop peripheral surface 711 to the front surface M1 of the printing medium M.

The bolts 751 (first/second fastening member) are provided for fastening the anti-drop members 7*l* and 7*r* to each of the air turn bars 6*u* and 6*l*. In this way, the anti-drop members 7*l* and 7*r* are fastened directly to each of the air turn bars 6*u* and 6*l* to facilitate positioning of the anti-drop members 7*l* and 7*r* and the air turn bars 6*u* and 6*l*.

Described next is a positioning mechanism J for positioning of the air turn bars 6*u* and 6*l* relative to the mounting plates 53 and 54 respectively. As a configuration is common between the positioning mechanism J for positioning of the air turn bar 6*u* relative to the mounting plate 53 and the positioning mechanism J for positioning of the air turn bar 6*l* relative to the mounting plate 54, the description given herein is about the configuration of the former positioning mechanism J.

Figure 9:
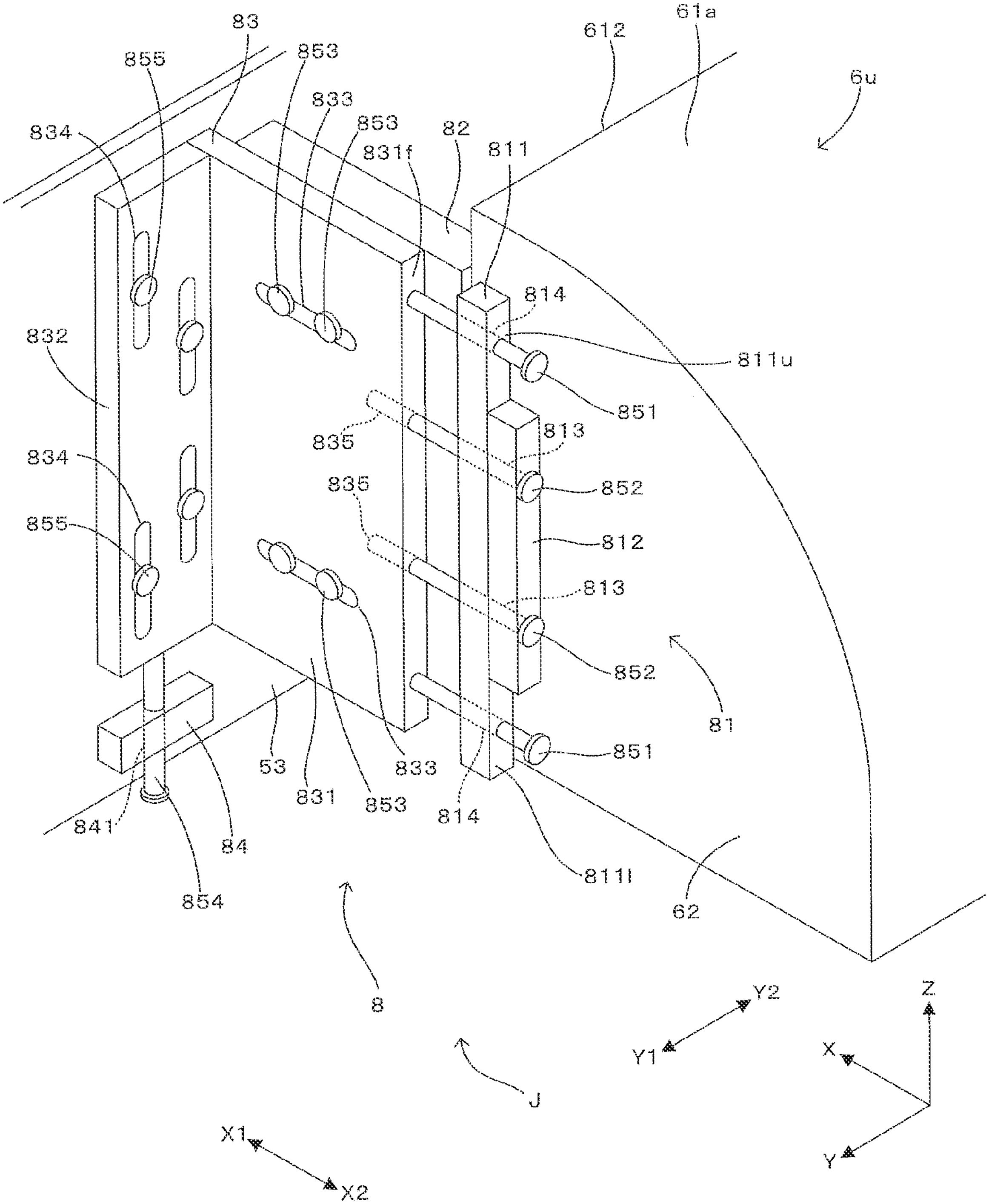
FIG. 9 is a perspective view schematically showing a position adjuster of the positioning mechanism.

FIG. 9 is a perspective view schematically showing a position adjuster of the positioning mechanism. Specifically, the positioning mechanism J includes a position adjuster 8 (FIG. 9) supporting an end on the Y1 side of the air turn bar 6*u*. The position adjuster 8 includes a horizontal adjustment plate 81 fixed to the side wall member 62 on the Y1 side of the air turn bar 6*u*. The horizontal adjustment plate 81 includes a long plate 811 and a short plate 812 both extended in the Z direction. The long plate 811 is located closer to the mounting plate 53 (closer to the X1 side) than the short plate 812. The short plate 812 is fixed to a side surface of the long plate 811 on the reverse side (X2 side) from the mounting plate 53. The short plate 812 is shorter than the long plate 811. Both ends (upper and lower ends) of the short plate 812 are located between both ends (upper and lower ends) of the long plate 811 in the Z direction. Specifically, in the Z direction, an upper end portion 811*u* of the long plate 811 projects upward further than the upper end of the short plate 812, and a lower end portion 811*l* of the long plate 811 projects downward further than the lower end of the short plate 812.

The horizontal adjustment plate 81 includes two through holes 813 arranged in the Z direction. The through holes 813 penetrate the long plate 811 and the short plate 812 in the X direction. The horizontal adjustment plate 81 further includes two pressure screw holes 814 arranged in the Z direction. The two pressure screw holes 814 include an upper pressure screw hole 814 penetrating the upper end portion 811*u* of the long plate 811 in the X direction, and a lower pressure screw hole 814 penetrating the lower end portion 811*l* of the long plate 811 in the X direction.

The position adjuster 8 further includes a bar fixing block 82 fixed to a back surface 612 of the bar body 61*a*. The back surface 612 of the bar body 61*a* is a plane facing the mounting plate 53 of the housing 5 and perpendicular to the X direction. The bar fixing block 82 is arranged in such a manner as to be perpendicular to the Y direction and projects toward the mounting plate 53 (X1 side) from the back surface 612 of the bar body 61*a*.

The position adjuster 8 further includes a movable bracket 83 adjoining the bar fixing block 82 from the Y1 side. The movable bracket 83 includes a block mounting plate 831 provided in such a manner as to be perpendicular to the Y direction, and a body mounting plate 832 provided in such a manner as to be perpendicular to the X direction. The block mounting plate 831 faces the bar fixing block 82 from the Y1 side. The body mounting plate 832 faces the mounting plate 53 from the X2 side. The block mounting plate 831 projects from the body mounting plate 832 toward the reverse side (X2 side) from the mounting plate 53. The block mounting plate 831 includes a facing surface 831*f* facing the horizontal adjustment plate 81 from the X1 side while spaced from the horizontal adjustment plate 81.

The movable bracket 83 includes two horizontal long holes 833 formed at the block mounting plate 831. The horizontal long hole 833 is extended parallel to the X direction and penetrates the block mounting plate 831 in the Y direction. The movable bracket 83 includes four vertical long holes 834 formed at the body mounting plate 832. The vertical long hole 834 is extended parallel to the Z direction and penetrates the body mounting plate 832 in the X direction. The movable bracket 83 further includes two tension screw holes 835 arranged in the Z direction. The two tension screw holes 835 are extended parallel to the X direction in the block mounting plate 831 and open at the facing surface 831*f*. The two tension screw holes 835 face the two through holes 813 of the horizontal adjustment plate 81 in the X direction.

The position adjuster 8 includes a vertical adjustment plate 84 facing the body mounting plate 832 from below. The vertical adjustment plate 84 is provided with a lifting screw hole 841 extended parallel to the Z direction. The lifting screw hole 841 penetrates the vertical adjustment plate 84 in the Z direction.

The position adjuster 8 further includes two pressure screws 851 and two tension screws 852 provided to the horizontal adjustment plate 81. The pressure screw 851 is screwed into the pressure screw hole 814 from the X2 side. A tip of the pressure screw 851 projects from the horizontal adjustment plate 81 toward the block mounting plate 831 (X1 side) to abut on the facing surface 831*f* of the block mounting plate 831. The tension screw 852 is inserted into the through hole 813 from the X2 side. A tip of the tension screw 852 projects from the through hole 813 toward the block mounting plate 831 (X1 side) to be threadedly engaged with the tension screw hole 835 formed at the block mounting plate 831. Specifically, the tip of the tension screw 852 is screwed into the tension screw hole 835 of the block mounting plate 831 from the X2 side. Meanwhile, a screw head of the tension screw 852 is located on the opposite side (X2 side) to the block mounting plate 831 relative to the through hole 813 and abuts on the horizontal adjustment plate 81.

In this configuration, screwing-in the pressure screw 851 to be threadedly engaged with the pressure screw hole 814 toward the X1 side generates force at the pressure screw 851 for separating the horizontal adjustment plate 81 and the movable bracket 83 from each other in the X direction. Furthermore, screwing-in the tension screw 852 to be threadedly engaged with the tension screw hole 835 toward the X1 side generates force at the tension screw 852 for making the horizontal adjustment plate 81 and the movable bracket 83 get closer to each other in the X direction. Thus, adjusting the amounts of screwing-in of the pressure screw 851 and the tension screw 852 allows the position of the air turn bar 6*u* relative to the mounting plate 53 of the housing 5 to be adjusted in the X direction.

The position adjuster 8 includes a plate fastening screw 853 inserted into the horizontal long hole 833. The plate fastening screw 853 is inserted into the horizontal long hole 833 from the Y1 side, and a tip of the plate fastening screw 853 is threadedly engaged with the bar fixing block 82. While the threaded engagement of the plate fastening screw 853 with the bar fixing block 82 is loosened, the plate fastening screw 853 is movable in the X direction relative to the horizontal long hole 833. This achieves the above-described position adjustment of the air turn bar 6*u* in the X direction using the pressure screw 851 and the tension screw 852. On the other hand, when this position adjustment is finished, the block mounting plate 831 is fastened to the bar fixing block 82 using the plate fastening screw 853, thereby allowing the position of the air turn bar 6*u* relative to the mounting plate 53 of the housing 5 to be fixed in the X direction.

The position adjuster 8 further includes one lifting screw 854 provided at the vertical adjustment plate 84. The lifting screw 854 is screwed into the lifting screw hole 841 from below. A tip of the lifting screw 854 projects upward from the vertical adjustment plate 84 to abut on the body mounting plate 832 from below.

In this configuration, screwing-in the lifting screw 854 upward to be threadedly engaged with the lifting screw hole 841 generates force at the lifting screw hole 841 for lifting the body mounting plate 832 upward relative to the vertical adjustment plate 84. Thus, adjusting the amount of screwing into the lifting screw hole 841 allows the position of the air turn bar 6*u* relative to the mounting plate 53 of the housing 5 to be adjusted in the Z direction.

The position adjuster 8 further includes a body fastening screw 855 inserted into the vertical long hole 834. The body fastening screw 855 is inserted into the vertical long hole 834 from the X2 side, and a tip of the body fastening screw 855 is threadedly engaged with the mounting plate 53 of the housing 5. While the threaded engagement of the body fastening screw 855 with the mounting plate 53 is loosened, the body fastening screw 855 is movable in the Z direction relative to the vertical long hole 834. This achieves the above-described position adjustment of the air turn bar 6*u* in the Z direction using the lifting screw 854. On the other hand, when this position adjustment is finished, the body mounting plate 832 is fastened to the mounting plate 53 of the housing 5 using the body fastening screw 855, thereby allowing the position of the air turn bar 6*u* relative to the mounting plate 53 of the housing 5 to be fixed in the Z direction.

Figure 10A:
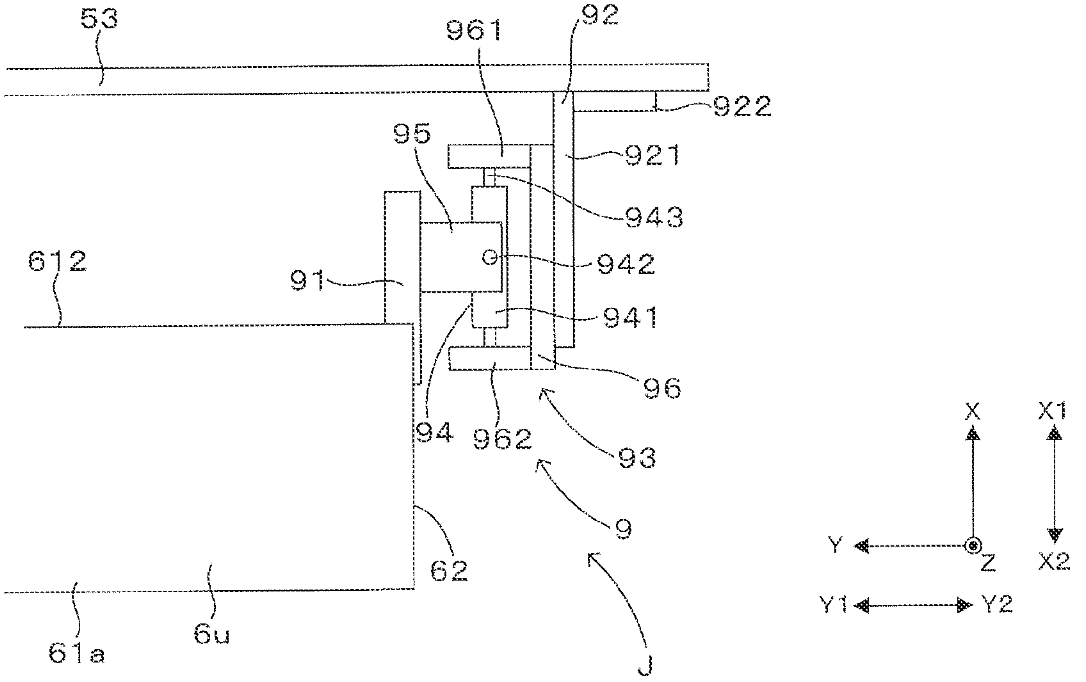
FIG. 10A is a plan view schematically showing a rotary support of the positioning mechanism.
Figure 10B:
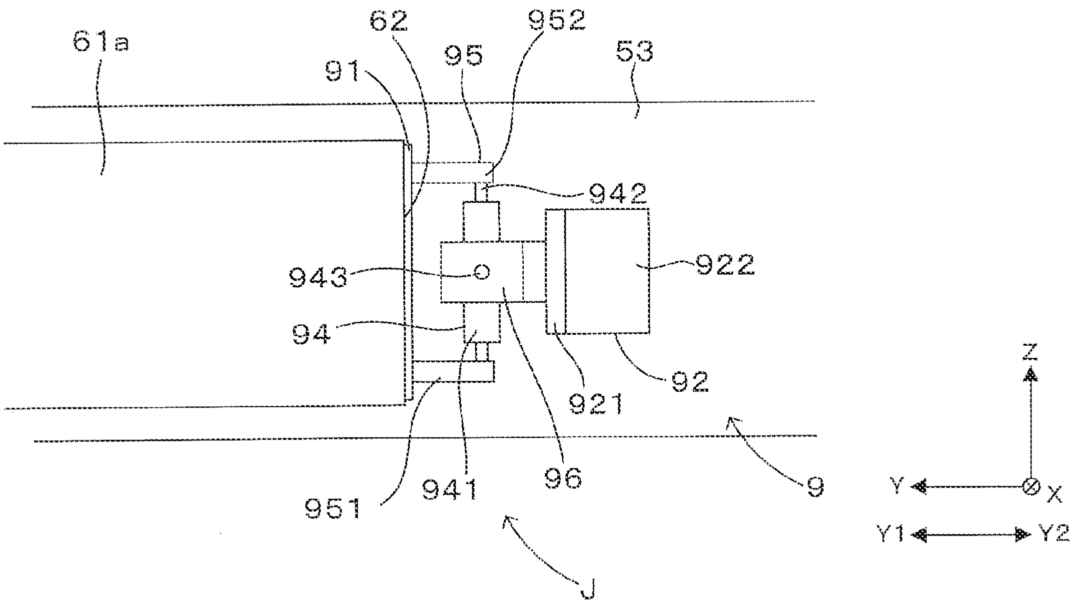
FIG. 10B is a side view schematically showing the rotary support of the positioning mechanism.
Figure 11:
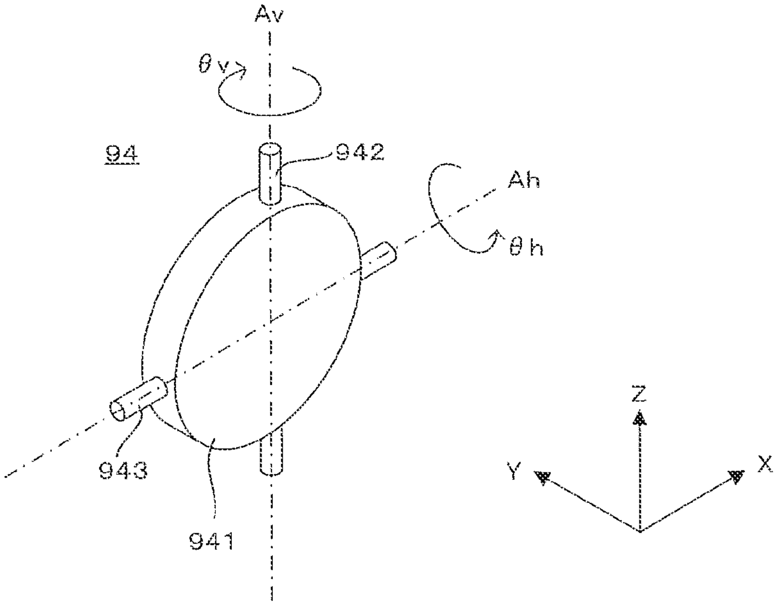
FIG. 11 is a perspective view schematically showing a biaxial rotary member of the positioning mechanism shown in FIGS. 10A and 10B.

FIG. 10A is a plan view schematically showing a rotary support of the positioning mechanism. FIG. 10B is a side view schematically showing the rotary support of the positioning mechanism. FIG. 11 is a perspective view schematically showing a biaxial rotary member of the positioning mechanism shown in FIGS. 10A and 10B. As shown in FIGS. 10A and 10B, the positioning mechanism J includes a rotary support 9 supporting an end on the Y2 side of the air turn bar 6*u*. The rotary support 9 includes a fixed plate 91 fixed to the side wall member 62 on the Y2 side and the back surface 612 of the air turn bar 6*u*. The fixed plate 91 projects from the back surface 612 of the air turn bar 6*u* toward the mounting plate 53 of the housing 5.

The rotary support 9 includes a fixed bracket 92 mounted on the mounting plate 53 of the housing 5. The fixed bracket 92 includes a projecting plate 921 provided in such a manner as to be perpendicular to the Y direction, and a body mounting plate 922 provided in such a manner as to be perpendicular to the X direction. The body mounting plate 922 is fixed to the mounting plate 53 of the housing 5. The projecting plate 921 projects from the body mounting plate 922 toward the X2 side.

The rotary support 9 includes a biaxial support 93 mutually supporting the fixed plate 91 and the fixed bracket 92 with two degrees of freedom. The biaxial support 93 includes a biaxial rotary member 94 shown in FIG. 11. The biaxial rotary member 94 includes a rotary member body 941, a vertical rotary axis member 942 provided along a vertical rotary axis Av parallel to the vertical direction and projecting in the vertical direction from the rotary member body 941, and a horizontal rotary axis member 943 provided along a horizontal rotary axis Ah parallel to the horizontal direction and projecting in the horizontal direction from the rotary member body 941. The biaxial rotary member 94 is rotatable in each of a rotary direction θv about the vertical rotary axis Av and a rotary direction θh about the horizontal rotary axis Ah.

Specifically, as shown in FIGS. 10A and 10B, the biaxial support 93 includes a vertical rotary support member 95 supporting the biaxial rotary member 94 axially rotatably. The vertical rotary support member 95 is fixed to the fixed plate 91 and projects from the fixed plate 91 toward the Y2 side. The vertical rotary support member 95 includes a lower end support plate 951 receiving a lower end of the vertical rotary axis member 942 of the biaxial rotary member 94, and an upper end support plate 952 receiving an upper end of the vertical rotary axis member 942 of the biaxial rotary member 94. The vertical rotary support member 95 supports the vertical rotary axis member 942 of the biaxial rotary member 94 in a manner allowing the vertical rotary axis member 942 to rotate in the rotary direction θv.

The biaxial support 93 further includes a horizontal rotary support member 96 supporting the biaxial rotary member 94 axially rotatably. The horizontal rotary support member 96 is fixed to the projecting plate 921 of the fixed bracket 92 and projects from the projecting plate 921 toward the Y1 side. The horizontal rotary support member 96 includes one end support plate 961 receiving one end of the horizontal rotary axis member 943 of the biaxial rotary member 94, an opposite end support plate 962 receiving the opposite end of the horizontal rotary axis member 943 of the biaxial rotary member 94. The horizontal rotary support member 96 supports the horizontal rotary axis member 943 of the biaxial rotary member 94 in a manner allowing the horizontal rotary axis member 943 to rotate in the rotary direction θh.

As described above, in the drying apparatus 3, in a zone from the middle-stage transfer part 31*m* (first transfer part) to the lower-stage transfer part 31*l* (second transfer part) via the air turn bars 6*u* and 6*l* (first/second non-contact support member) (specifically, in a zone after passage through the roller 32*l* to arrival at the unloading roller 33), the printing medium M is transferred in a non-contact manner (in other words, transferred in a floating state). Thus, in some cases, by the influence of wind generated by air (gas) injected in the middle-stage transfer part 31*m* and in the lower-stage transfer part 31*l*, the printing medium M travels obliquely to drop in the Y direction from the air turn bar 6*u* or 6*l*. In response to this, according to the embodiment described using FIGS. 9 to 11, the positioning mechanisms J (first/second positioning part) are provided for positioning of the air turn bars 6*u* and 6*l* (first/second non-contact support member) relative to the housing 5 (body frame). Each of these positioning mechanisms J includes the rotary support 9 (first/second rotary support) and the position adjuster 8 (first/second position adjuster), and the both ends of each of the air turn bars 6*u* and 6*l* are supported by the rotary support 9 and the position adjuster 8. In particular, the rotary support 9 supports each of the air turn bars 6*u* and 6*l* relative to the housing 5 in a manner allowing each of the air turn bars 6*u* and 6*l* to rotate in each of the rotary direction θh about the horizontal rotary axis Ah (first/second horizontal rotary axis) parallel to the horizontal direction and the rotary direction θv about the vertical rotary axis Av (first/second vertical rotary axis) parallel to the vertical direction. The position adjuster 8 supports each of the air turn bars 6*u* and 6*l* relative to the housing 5 in a manner allowing the position of each of the air turn bars 6*u* and 6*l* relative to the housing 5 to be adjusted in each of the X direction (horizontal direction) and the Z direction (vertical direction). Thus, it is possible to adjust the position of each of the air turn bars 6*u* and 6*l* relative to the housing 5 in each of the X direction and the Z direction. This achieves position adjustment of each of the air turn bars 6*u* and 6*l* in such a manner that the printing medium M will not drop from the air turn bars 6*u* and 6*l*. As a result, it becomes possible to prevent drop of the printing medium M from the air turn bars 6*u* and 6*l* supporting the printing medium M in a non-contact manner.

The rotary support 9 includes the biaxial rotary member 94 (first/second rotary member) rotatable about each of the horizontal rotary axis Ah (first/second horizontal rotary axis) and the vertical rotary axis Av (first/second vertical rotary axis). More specifically, the rotary support 9 includes the fixed bracket 92 (first/second fixed bracket) fixed to the housing 5, and the horizontal rotary support member 96 (first/second horizontal rotary support member) mounted on the fixed bracket 92. The biaxial rotary member 94 is supported by the horizontal rotary support member 96 in such a manner as to be rotatable about the horizontal rotary axis Ah. The rotary support 9 includes the fixed plate 91 (first/second fixed plate) fixed to each of the air turn bars 6*u* and 6*l*, and the vertical rotary support member 95 (first/second vertical rotary support member) supported by the fixed plate 91. The biaxial rotary member 94 is supported by the vertical rotary support member 95 in such a manner as to be rotatable about the vertical rotary axis Av. In this configuration, each of the air turn bars 6*u* and 6*l* can be supported in such a manner as to be rotatable in each of the horizontal direction and the vertical direction.

The air supplier 57 (gas supplier) is arranged on the Y2 side of the Y direction (the width direction of the printing medium M) relative to the air turn bars 6*u* and 6*l*. The pipe 63 at the end on the Y2 side of the air turn bar 6*u* and the duct 572*u* of the air supplier 57 are connected to each other and the duct 572*u* supplies air supplied from the air supplier 57 to the air turn bar 6*u* through the pipe 63. The pipe 63 at the end on the Y2 side of the air turn bar 6*l* and the duct 572*l* of the air supplier 57 are connected to each other and the duct 572*l* supplies air supplied from the air supplier 57 to the air turn bar 6*l* through the pipe 63. In response to this, the rotary support 9 (first/second rotary support) supports an end on a predetermined side of each of the air turn bars 6*u* and 6*l*. In this configuration, the position adjuster 8 where an operator conducts work for position adjustment of each of the air turn bars 6*u* and 6*l* is located on the reverse side from each of the ducts 572*u* and 572*l* for gas supply. This allows the operator to conduct the work for position adjustment without being interfered with by the ducts 572*u* and 572*l*.

The position adjuster 8 includes the movable bracket 83 (first/second movable bracket). The movable bracket 83 includes the body mounting plate 832 (first/second body mounting part) having the vertical long hole 834 (first/second vertical long hole) parallel to the Z direction, and the block mounting plate 831 (first/second plate mounting part) extended from the body mounting plate 832 in the X direction and having the horizontal long hole 833 (first/second horizontal long hole) parallel to the X direction. The position adjuster 8 further includes the bar fixing block 82 (first/second support plate) facing the block mounting plate 831 and mounted on each of the air turn bars 6*u* and 6*l*. The body fastening screw 855 (first/second body fastening member) is inserted into the vertical long hole 834 (first/second vertical long hole) of the body mounting plate 832 to fasten the body mounting plate 832 to the mounting plate 53 of the housing 5. The plate fastening screw 853 (first/second plate fastening member) is inserted into the horizontal long hole 833 of the block mounting plate 831 to fasten the block mounting plate 831 to the bar fixing block 82. In this configuration, the position of each of the air turn bars 6*u* and 6*l* becomes adjustable in each of the horizontal direction and the vertical direction by adjusting the position of the horizontal long hole 833 relative to the plate fastening screw 853 and by adjusting the position of the vertical long hole 834 relative to the body fastening screw 855.

The position adjuster 8 includes the horizontal adjustment plate 81 (first/second horizontal adjustment plate). The horizontal adjustment plate 81 is provided with the pressure screw hole 814 (first/second pressure screw hole) extended in the X direction, and the through hole 813 (first/second through hole) extended in the X direction. The pressure screw 851 (first/second pressure screw) is threadedly engaged with the pressure screw hole 814 and the tension screw 852 (first/second tension screw) is inserted into the through hole 813. A tip of the pressure screw 851 projects from the pressure screw hole 814 toward the block mounting plate 831 to abut on the block mounting plate 831. A tip of the tension screw 852 projects from the through hole 813 toward the block mounting plate 831 to be threadedly engaged with the tension screw hole 835 formed at the block mounting plate 831. Meanwhile, a screw head of the tension screw 852 is located on the opposite side to the block mounting plate 831 relative to the through hole 813 and abuts on the horizontal adjustment plate 81. Screwing the pressure screw 851 toward the block mounting plate 831 into the pressure screw hole 814 separates the block mounting plate 831 from the horizontal adjustment plate 81 in the X direction. Screwing the tension screw 852 toward the block mounting plate 831 into the tension screw hole 835 makes the block mounting plate 831 get closer to the horizontal adjustment plate 81. This configuration allows the position of each of the air turn bars 6*u* and 6*l* to be adjusted in the X direction through the simple operation of handling the pressure screw 851 and the tension screw 852.

The position adjuster 8 includes the vertical adjustment plate 84 (first/second vertical adjustment plate). The vertical adjustment plate 84 is provided with the lifting screw hole 841 (first/second lifting screw hole) extended in the Z direction. The lifting screw 854 is threadedly engaged with the lifting screw hole 841. A tip of the lifting screw 854 projects upward from the lifting screw hole 841 toward the body mounting plate 832 to abut on the body mounting plate 832 from below. Screwing the lifting screw 854 toward the body mounting plate 832 into the lifting screw hole 841 lifts the body mounting plate 832 upward. This configuration allows the position of each of the air turn bars 6*u* and 6*l* to be adjusted in the Z direction through the simple operation of handling the lifting screw 854.

In the above-described embodiment, the drying apparatus 3 corresponds to an example of a "drying apparatus" of the present invention, the middle-stage transfer part 31*m* corresponds to an example of a "first transfer part" of the present invention, the lower-stage transfer part 31*l* corresponds to an example of a "second transfer part" of the present invention, the nozzle 46*u* corresponds to an example of a "first/second upper nozzle" of the present invention, the nozzle 46*l* corresponds to an example of a "first/second lower nozzle" of the present invention, the X direction corresponds to an example of a "horizontal direction" of the present invention, the X1 side corresponds to an example of the "other side" of the present invention, the X2 side corresponds to an example of "one side" of the present invention, the air turn bar 6*u* corresponds to an example of a "first non-contact support member" of the present invention, the air turn bar 6*l* corresponds to an example of a "second non-contact support member" of the present invention, the support peripheral surface 611 corresponds to an example of a "first/second support peripheral surface" of the present invention, the air injection hole H corresponds to an example of a "first/second injection hole" of the present invention, each of the anti-drop members 7*l* and 7*r* provided at the both ends of the air turn bar 6*u* corresponds to an example of a "first anti-drop member" of the present invention, each of the anti-drop members 7*l* and 7*r* provided at the both ends of the air turn bar 6*l* corresponds to an example of a "second anti-drop member" of the present invention, the anti-drop peripheral surface 711 corresponds to an example of a "first/second anti-drop peripheral surface" of the present invention, the bolt 751 corresponds to an example of a "first/second fastening member" of the present invention, the housing 5 corresponds to an example of a "body frame" of the present invention, the positioning mechanism J provided to the air turn bar 6*u* corresponds to an example of a "first positioning part" of the present invention, the positioning mechanism J provided to the air turn bar 6*l* corresponds to an example of a "second positioning part" of the present invention, the rotary support 9 corresponds to an example of a "first/second rotary support" of the present invention, the position adjuster 8 corresponds to an example of a "first/second position adjuster" of the present invention, the horizontal rotary axis Ah corresponds to an example of a "first/second horizontal rotary axis" of the present invention, the vertical rotary axis Av corresponds to an example of a "first/second vertical rotary axis" of the present invention, the fixed bracket 92 corresponds to an example of a "first/second fixed bracket" of the present invention, the horizontal rotary support member 96 corresponds to an example of a "first/second horizontal rotary support member" of the present invention, the biaxial rotary member 94 corresponds to an example of a "first/second rotary member" of the present invention, the vertical rotary support member 95 corresponds to an example of a "first/second vertical rotary support member" of the present invention, the fixed plate 91 corresponds to an example of a "first/second fixed plate" of the present invention, the air supplier 57 corresponds to an example of a "gas supplier" of the present invention, the duct 572*u* corresponds to an example of a "first duct" of the present invention, the duct 572*l* corresponds to an example of a "second duct" of the present invention, the vertical long hole 834 corresponds to an example of a "first/second vertical long hole" of the present invention, the body mounting plate 832 corresponds to an example of a "first/second body mounting part" of the present invention, the horizontal long hole 833 corresponds to an example of a "first/second horizontal long hole" of the present invention, the block mounting plate 831 corresponds to an example of a "first/second plate mounting part" of the present invention, the movable bracket 83 corresponds to an example of a "first/second movable bracket" of the present invention, the bar fixing block 82 corresponds to an example of a "first/second support plate" of the present invention, the body fastening screw 855 corresponds to an example of a "first/second body fastening member" of the present invention, the plate fastening screw 853 corresponds to an example of a "first/second plate fastening member" of the present invention, the pressure screw hole 814 corresponds to an example of a "first/second pressure screw hole" of the present invention, the through hole 813 corresponds to an example of a "first/second through hole" of the present invention, the horizontal adjustment plate 81 corresponds to an example of a "first/second horizontal adjustment plate" of the present invention, the pressure screw 851 corresponds to an example of a "first/second pressure screw" of the present invention, the tension screw 852 corresponds to an example of a "first/second tension screw" of the present invention, the tension screw hole 835 corresponds to an example of a "first/second tension screw hole" of the present invention, the lifting screw 854 corresponds to an example of a "first/second lifting screw" of the present invention, the vertical adjustment plate 84 corresponds to an example of a "first/second vertical adjustment plate" of the present invention, and the lifting screw hole 841 corresponds to an example of a "first/second lifting screw hole" of the present invention.

The present invention is not limited to the above-described embodiment but various variations other than the matters described above can be devised without departing from the scope of the invention. For example, the anti-drop members 7*l* and 7*r* are not always required to be mounted on the air turn bars 6*u* and 6*l* but may be mounted on the housing 5.

The positions of the support peripheral surface 611 and the anti-drop peripheral surface 711 relative to each other are not limited to those of the example shown in FIG. 7B but the support peripheral surface 611 and the anti-drop peripheral surface 711 may be flush with each other.

In the positioning mechanism J, the position adjuster 8 may be provided on the Y2 side and the rotary support 9 may be provided on the Y1 side.

The present invention is applicable to every technique of drying aqueous ink applied to a recording surface of an elongated strip-shaped base material.

The drying apparatus may be configured so that in a side view from the width direction, the first support peripheral surface projects further than the first anti-drop peripheral surface and the second support peripheral surface projects further than the second anti-drop peripheral surface. This generates smooth airflows flowing from the first and second support peripheral surfaces toward the first and second anti-drop peripheral surfaces respectively to form the clearance reliably between each of the first and second anti-drop peripheral surfaces and the printing medium. This allows the printing medium deviated by oblique traveling to be supported by the first and second anti-drop peripheral surfaces while the clearance is formed from each of the first and second anti-drop peripheral surfaces to the printing surface of the printing medium.

The drying apparatus may further comprise: a first fastening member fastening the first anti-drop members to the first non-contact support member; and a second fastening member fastening the second anti-drop members to the second non-contact support member. In this way, the first and second anti-drop members are fastened directly to the first and second non-contact support members respectively to allow positioning of the first and second anti-drop members and the first and second non-contact support members.

The drying apparatus may comprises: a body frame supporting the first transfer part and the second transfer part; a first positioning part positioning the first non-contact support member relative to the body frame; and a second positioning part positioning the second non-contact support member relative to the body frame, wherein the first positioning part includes a first rotary support and a first position adjuster, and supports the both ends of the first non-contact support member by the first rotary support and the first position adjuster, the first rotary support supports the first non-contact support member relative to the body frame in a manner allowing the first non-contact support member to rotate in each of a rotary direction about a first horizontal rotary axis parallel to the horizontal direction and a rotary direction about a first vertical rotary axis parallel to a vertical direction, the first position adjuster supports the first non-contact support member relative to the body frame in a manner allowing the position of the first non-contact support member relative to the body frame to be adjusted in each of the horizontal direction and the vertical direction, the second positioning part includes a second rotary support and a second position adjuster, and supports the both ends of the second non-contact support member by the second rotary support and the second position adjuster, the second rotary support supports the second non-contact support member relative to the body frame in a manner allowing the second non-contact support member to rotate in each of a rotary direction about a second horizontal rotary axis parallel to the horizontal direction and a rotary direction about a second vertical rotary axis parallel to the vertical direction, and the second position adjuster supports the second non-contact support member relative to the body frame in a manner allowing the position of the second non-contact support member relative to the body frame to be adjusted in each of the horizontal direction and the vertical direction.

This configuration includes the first and second positioning parts positioning the first and second non-contact support members relative to the body frame respectively. The first and second positioning parts include the first and second rotary supports and the first and second position adjusters respectively, and the respective both ends of the first and second non-contact support members are supported by the first rotary support and the first position adjuster and by the second rotary support and the second position adjuster respectively. In particular, the first and second rotary supports support the first and second non-contact support member relative to the body frame in a manner allowing the first and second non-contact support member to rotate in the rotary directions about the first and second horizontal rotary axes parallel to the horizontal direction and the rotary directions about the first and second vertical rotary axes parallel to the vertical direction. The first and second position adjusters support the first and second non-contact support members respectively relative to the body frame in a manner allowing the positions of the first and second non-contact support members relative to the body frame to be adjusted in each of the horizontal direction and the vertical direction. Thus, it is possible to adjust the positions of the first and second non-contact support members relative to the body frame in each of the horizontal direction and the vertical direction. This achieves position adjustment of the first and second non-contact support members in such a manner that the printing medium will not drop from the first and second non-contact support members. As a result, it becomes possible to prevent drop of the printing medium from the non-contact support member supporting the printing medium in a non-contact manner.

The drying apparatus may be configured so that the first rotary support includes: a first fixed bracket fixed to the body frame; a first horizontal rotary support member mounted on the first fixed bracket; a first rotary member supported by the first horizontal rotary support member in such a manner as to be rotatable about the first horizontal rotary axis; a first vertical rotary support member supporting the first rotary member in a manner allowing the first rotary member to rotate about the first vertical rotary axis; and a first fixed plate supporting the first vertical rotary support member and fixed to the first non-contact support member, and the second rotary support includes: a second fixed bracket fixed to the body frame; a second horizontal rotary support member mounted on the second fixed bracket; a second rotary member supported by the second horizontal rotary support member in such a manner as to be rotatable about the second horizontal rotary axis; a second vertical rotary support member supporting the second rotary member in a manner allowing the second rotary member to rotate about the second vertical rotary axis; and a second fixed plate supporting the second vertical rotary support member and fixed to the second non-contact support member. In this configuration, the first and second non-contact support members can be supported in such a manner as to be rotatable in each of the horizontal direction and the vertical direction.

The drying apparatus may further comprises: a gas supplier arranged on a predetermined side of the width direction of the printing medium relative to the first non-contact support member and the second non-contact support member; a first duct connecting the gas supplier and an end on the predetermined side of the first non-contact support member to each other and supplying gas from the gas supplier to the first non-contact support member; and a second duct connecting the gas supplier and an end on the predetermined side of the second non-contact support member to each other and supplying gas from the gas supplier to the second non-contact support member, wherein the first non-contact support member injects the gas supplied by the first duct from the first injection holes, the second non-contact support member injects the gas supplied by the second duct from the second injection holes, the first rotary support supports the end on the predetermined side of the first non-contact support member, and the second rotary support supports the end on the predetermined side of the second non-contact support member. In this configuration, the first and second position adjusters where an operator conducts work for position adjustment of the first and second non-contact support members respectively are located on the reverse side from the first and second ducts for gas supply respectively. This allows the operator to conduct the work for position adjustment without being interfered with by the first and second ducts.

The drying apparatus may be configured so that the first position adjuster includes:

a first movable bracket including a first body mounting part having a first vertical long hole parallel to the vertical direction, and a first plate mounting part extended from the first body mounting part in the horizontal direction and having a first horizontal long hole parallel to the horizontal direction; a first support plate facing the first plate mounting part and mounted on the first non-contact support member; a first body fastening member inserted into the first vertical long hole of the first body mounting part to fasten the first body mounting part to the body frame; and a first plate fastening member inserted into the first horizontal long hole of the first plate mounting part to fasten the first plate mounting part to the first support plate, and the second position adjuster includes: a second movable bracket including a second body mounting part having a second vertical long hole parallel to the vertical direction, and a second plate mounting part extended from the second body mounting part in the horizontal direction and having a second horizontal long hole parallel to the horizontal direction; a second support plate facing the second plate mounting part and mounted on the second non-contact support member; a second body fastening member inserted into the second vertical long hole of the second body mounting part to fasten the second body mounting part to the body frame; and a second plate fastening member inserted into the second horizontal long hole of the second plate mounting part to fasten the second plate mounting part to the second support plate. This configuration makes the positions of the first and second non-contact support members adjustable in each of the horizontal direction and the vertical direction.

The drying apparatus may be configured so that the first position adjuster includes:

a first horizontal adjustment plate having a first pressure screw hole extended in the horizontal direction and a first through hole extended in the horizontal direction, and mounted on the first non-contact support member; a first pressure screw threadedly engaged with the first pressure screw hole; and a first tension screw inserted into the first through hole, a tip of the first pressure screw projects from the first pressure screw hole toward the first plate mounting part to abut on the first plate mounting part, a tip of the first tension screw projects from the first through hole toward the first plate mounting part to be threadedly engaged with a first tension screw hole formed at the first plate mounting part, a screw head of the first tension screw is located on the opposite side to the first plate mounting part relative to the first through hole and abuts on the first horizontal adjustment plate, screwing the first pressure screw toward the first plate mounting part into the first pressure screw hole makes the first plate mounting part get farther from the first horizontal adjustment plate, screwing the first tension screw toward the first plate mounting part into the first tension screw hole makes the first plate mounting part get closer to the first horizontal adjustment plate, the second position adjuster includes: a second horizontal adjustment plate having a second pressure screw hole extended in the horizontal direction and a second through hole extended in the horizontal direction, and mounted on the second non-contact support member; a second pressure screw threadedly engaged with the second pressure screw hole; and a second tension screw inserted into the second through hole, a tip of the second pressure screw projects from the second pressure screw hole toward the second plate mounting part to abut on the second plate mounting part, a tip of the second tension screw projects from the second through hole toward the second plate mounting part to be threadedly engaged with a second tension screw hole formed at the second plate mounting part, a screw head of the second tension screw is located on the opposite side to the second plate mounting part relative to the second through hole and abuts on the second horizontal adjustment plate, screwing the second pressure screw toward the second plate mounting part into the second pressure screw hole makes the second plate mounting part get farther from the second horizontal adjustment plate, and screwing the second tension screw toward the second plate mounting part into the second tension screw hole makes the second plate mounting part get closer to the second horizontal adjustment plate. This configuration allows the positions of the first and second non-contact support members to be adjusted in the horizontal direction through the simple operation of handling the first and second pressure screws and the first and second tension screws.

The drying apparatus may be configured so that the first position adjuster includes: a first vertical adjustment plate having a first lifting screw hole extended in the vertical direction, and mounted on the body frame below the first body mounting part; and a first lifting screw threadedly engaged with the first lifting screw hole, a tip of the first lifting screw projects upward from the first lifting screw hole toward the first body mounting part to abut on the first body mounting part, screwing the first lifting screw toward the first body mounting part into the first lifting screw hole lifts the first body mounting part upward, the second position adjuster includes: a second vertical adjustment plate having a second lifting screw hole extended in the vertical direction, and mounted on the body frame below the second body mounting part; and a second lifting screw threadedly engaged with the second lifting screw hole, a tip of the second lifting screw projects upward from the second lifting screw hole toward the second body mounting part to abut on the second body mounting part, and screwing the second lifting screw toward the second body mounting part into the second lifting screw hole lifts the second body mounting part upward. This configuration allows the positions of the first and second non-contact support members to be adjusted in the vertical direction through the simple operation of handling the first and second lifting screws.

The drying apparatus may be configured so that the first rotary support includes: a first fixed bracket fixed to the body frame; a first horizontal rotary support member mounted on the first fixed bracket; a first rotary member supported by the first horizontal rotary support member in such a manner as to be rotatable about the first horizontal rotary axis; a first vertical rotary support member supporting the first rotary member in a manner allowing the first rotary member to rotate about the first vertical rotary axis; and a first fixed plate supporting the first vertical rotary support member and fixed to the first non-contact support member, and the second rotary support includes: a second fixed bracket fixed to the body frame; a second horizontal rotary support member mounted on the second fixed bracket; a second rotary member supported by the second horizontal rotary support member in such a manner as to be rotatable about the second horizontal rotary axis; a second vertical rotary support member supporting the second rotary member in a manner allowing the second rotary member to rotate about the second vertical rotary axis; and a second fixed plate supporting the second vertical rotary support member and fixed to the second non-contact support member. In this configuration, the first and second non-contact support members can be supported in such a manner as to be rotatable in each of the horizontal direction and the vertical direction.

The drying apparatus may further comprises: a gas supplier arranged on a predetermined side of the width direction of the printing medium relative to the first non-contact support member and the second non-contact support member; a first duct connecting the gas supplier and an end on the predetermined side of the first non-contact support member to each other and supplying gas from the gas supplier to the first non-contact support member; and a second duct connecting the gas supplier and an end on the predetermined side of the second non-contact support member to each other and supplying gas from the gas supplier to the second non-contact support member, wherein the first non-contact support member injects the gas supplied by the first duct from the first injection holes, the second non-contact support member injects the gas supplied by the second duct from the second injection holes, the first rotary support supports the end on the predetermined side of the first non-contact support member, and the second rotary support supports the end on the predetermined side of the second non-contact support member. In this configuration, the first and second position adjusters where an operator conducts work for position adjustment of the first and second non-contact support members respectively are located on the reverse side from the first and second ducts for gas supply respectively.

This allows the operator to conduct the work for position adjustment without being interfered with by the first and second ducts.

The drying apparatus may be configured so that the first position adjuster includes:

a first movable bracket including a first body mounting part having a first vertical long hole parallel to the vertical direction, and a first plate mounting part extended from the first body mounting part in the horizontal direction and having a first horizontal long hole parallel to the horizontal direction; a first support plate facing the first plate mounting part and mounted on the first non-contact support member; a first body fastening member inserted into the first vertical long hole of the first body mounting part to fasten the first body mounting part to the body frame; and a first plate fastening member inserted into the first horizontal long hole of the first plate mounting part to fasten the first plate mounting part to the first support plate, and the second position adjuster includes: a second movable bracket including a second body mounting part having a second vertical long hole parallel to the vertical direction, and a second plate mounting part extended from the second body mounting part in the horizontal direction and having a second horizontal long hole parallel to the horizontal direction; a second support plate facing the second plate mounting part and mounted on the second non-contact support member; a second body fastening member inserted into the second vertical long hole of the second body mounting part to fasten the second body mounting part to the body frame; and a second plate fastening member inserted into the second horizontal long hole of the second plate mounting part to fasten the second plate mounting part to the second support plate. This configuration makes the positions of the first and second non-contact support members adjustable in each of the horizontal direction and the vertical direction.

The drying apparatus may be configured so that the first position adjuster includes: a first horizontal adjustment plate having a first pressure screw hole extended in the horizontal direction and a first through hole extended in the horizontal direction, and mounted on the first non-contact support member; a first pressure screw threadedly engaged with the first pressure screw hole; and a first tension screw inserted into the first through hole, a tip of the first pressure screw projects from the first pressure screw hole toward the first plate mounting part to abut on the first plate mounting part, a tip of the first tension screw projects from the first through hole toward the first plate mounting part to be threadedly engaged with a first tension screw hole formed at the first plate mounting part, a screw head of the first tension screw is located on the opposite side to the first plate mounting part relative to the first through hole and abuts on the first horizontal adjustment plate, screwing the first pressure screw toward the first plate mounting part into the first pressure screw hole makes the first plate mounting part get farther from the first horizontal adjustment plate, screwing the first tension screw toward the first plate mounting part into the first tension screw hole makes the first plate mounting part get closer to the first horizontal adjustment plate, the second position adjuster includes: a second horizontal adjustment plate having a second pressure screw hole extended in the horizontal direction and a second through hole extended in the horizontal direction, and mounted on the second non-contact support member; a second pressure screw threadedly engaged with the second pressure screw hole; and a second tension screw inserted into the second through hole, a tip of the second pressure screw projects from the second pressure screw hole toward the second plate mounting part to abut on the second plate mounting part, a tip of the second tension screw projects from the second through hole toward the second plate mounting part to be threadedly engaged with a second tension screw hole formed at the second plate mounting part, a screw head of the second tension screw is located on the opposite side to the second plate mounting part relative to the second through hole and abuts on the second horizontal adjustment plate, screwing the second pressure screw toward the second plate mounting part into the second pressure screw hole makes the second plate mounting part get farther from the second horizontal adjustment plate, and screwing the second tension screw toward the second plate mounting part into the second tension screw hole makes the second plate mounting part get closer to the second horizontal adjustment plate. This configuration allows the positions of the first and second non-contact support members to be adjusted in the horizontal direction through the simple operation of handling the first and second pressure screws and the first and second tension screws.

The drying apparatus may be configured so that the first position adjuster includes: a first vertical adjustment plate having a first lifting screw hole extended in the vertical direction, and mounted on the body frame below the first body mounting part; and a first lifting screw threadedly engaged with the first lifting screw hole, a tip of the first lifting screw projects upward from the first lifting screw hole toward the first body mounting part to abut on the first body mounting part, screwing the first lifting screw toward the first body mounting part into the first lifting screw hole lifts the first body mounting part upward, the second position adjuster includes: a second vertical adjustment plate having a second lifting screw hole extended in the vertical direction, and mounted on the body frame below the second body mounting part; and a second lifting screw threadedly engaged with the second lifting screw hole, a tip of the second lifting screw projects upward from the second lifting screw hole toward the second body mounting part to abut on the second body mounting part, and screwing the second lifting screw toward the second body mounting part into the second lifting screw hole lifts the second body mounting part upward. This configuration allows the positions of the first and second non-contact support members to be adjusted in the vertical direction through the simple operation of handling the first and second lifting screws.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A drying apparatus comprising:

a first transfer part including a plurality of first upper nozzles arranged in a horizontal direction above an elongated strip-shaped printing medium having a printing surface on which ink is adhered and a non-printing surface on the reverse side from the printing surface, and a plurality of first lower nozzles arranged in the horizontal direction below the printing medium, the first transfer part injecting gas onto the printing medium from the first upper nozzles and injecting gas onto the printing medium from the first lower nozzles, and transferring the printing medium toward one side of the horizontal direction with the printing surface pointed downward;

a first non-contact support member including a first support peripheral surface to face the printing surface of the printing medium having been transferred from the first transfer part toward the one side, and a plurality of first injection holes opening at the first support peripheral surface, the first non-contact support member changing a traveling direction of the printing medium from a direction toward the one side of the horizontal direction to a downward direction while supporting the printing surface of the printing medium in a non-contact manner by injecting gas from the first injection holes onto the printing surface of the printing medium;

a second non-contact support member including a second support peripheral surface to face the printing surface of the printing medium having been transferred downward from the first non-contact support member, and a plurality of second injection holes opening at the second support peripheral surface, the second non-contact support member changing a traveling direction of the printing medium from the downward direction to a direction toward the other side of the horizontal direction on the reverse side from the one side while supporting the printing surface of the printing medium in a non-contact manner by injecting gas from the second injection holes onto the printing surface of the printing medium;

a second transfer part including a plurality of second upper nozzles arranged in the horizontal direction above the printing medium having been transferred toward the other side of the horizontal direction from the second non-contact support member, and a plurality of second lower nozzles arranged in the horizontal direction below the printing medium, the second transfer part injecting gas onto the printing medium from the second upper nozzles and injecting gas onto the printing medium from the second lower nozzles, and transferring the printing medium toward the other side of the horizontal direction with the printing surface pointed upward;

two first anti-drop members provided at corresponding both ends of the first non-contact support member in a width direction of the printing medium; and two second anti-drop members provided at corresponding both ends of the second non-contact support member in the width direction of the printing medium, wherein each of the first anti-drop members includes a first anti-drop peripheral surface adjoining the first support peripheral surface of the first non-contact support member in the width direction, each of the second anti-drop members includes a second anti-drop peripheral surface adjoining the second support peripheral surface of the second non-contact support member in the width direction, when the printing medium travels obliquely to be deviated from the first support peripheral surface to the first anti-drop peripheral surface, the gas injected from the first injection holes at the first support peripheral surface flows through a clearance between the first support peripheral surface and the printing surface of the printing medium facing the first support peripheral surface toward the first anti-drop peripheral surface to form a clearance between the first anti-drop peripheral surface and the printing surface of the printing medium facing the first anti-drop peripheral surface, and when the printing medium travels obliquely to be deviated from the second support peripheral surface to the second anti-drop peripheral surface, the gas injected from the second injection holes at the second support peripheral surface flows through a clearance between the second support peripheral surface and the printing surface of the printing medium facing the second support peripheral surface toward the second anti-drop peripheral surface to form a clearance between the second anti-drop peripheral surface and the printing surface of the printing medium facing the second anti-drop peripheral surface.

2. The drying apparatus according to claim 1, wherein in a side view from the width direction, the first support peripheral surface projects further than the first anti-drop peripheral surface and the second support peripheral surface projects further than the second anti-drop peripheral surface.

3. The drying apparatus according to claim 1, further comprising:

a first fastening member fastening the first anti-drop members to the first non-contact support member; and a second fastening member fastening the second anti-drop members to the second non-contact support member.

4. The drying apparatus according to claim 1, comprising:

a body frame supporting the first transfer part and the second transfer part;

a first positioning part positioning the first non-contact support member relative to the body frame; and a second positioning part positioning the second non-contact support member relative to the body frame, wherein the first positioning part includes a first rotary support and a first position adjuster, and supports the both ends of the first non-contact support member by the first rotary support and the first position adjuster, the first rotary support supports the first non-contact support member relative to the body frame in a manner allowing the first non-contact support member to rotate in each of a rotary direction about a first horizontal rotary axis parallel to the horizontal direction and a rotary direction about a first vertical rotary axis parallel to a vertical direction, the first position adjuster supports the first non-contact support member relative to the body frame in a manner allowing the position of the first non-contact support member relative to the body frame to be adjusted in each of the horizontal direction and the vertical direction, the second positioning part includes a second rotary support and a second position adjuster, and supports the both ends of the second non-contact support member by the second rotary support and the second position adjuster, the second rotary support supports the second non-contact support member relative to the body frame in a manner allowing the second non-contact support member to rotate in each of a rotary direction about a second horizontal rotary axis parallel to the horizontal direction and a rotary direction about a second vertical rotary axis parallel to the vertical direction, and the second position adjuster supports the second non-contact support member relative to the body frame in a manner allowing the position of the second non-contact support member relative to the body frame to be adjusted in each of the horizontal direction and the vertical direction.

5. The drying apparatus according to claim 4, wherein the first rotary support includes:

a first fixed bracket fixed to the body frame;

a first horizontal rotary support member mounted on the first fixed bracket;

a first rotary member supported by the first horizontal rotary support member in such a manner as to be rotatable about the first horizontal rotary axis;

a first vertical rotary support member supporting the first rotary member in a manner allowing the first rotary member to rotate about the first vertical rotary axis; and a first fixed plate supporting the first vertical rotary support member and fixed to the first non-contact support member, and the second rotary support includes:

a second fixed bracket fixed to the body frame;

a second horizontal rotary support member mounted on the second fixed bracket;

a second rotary member supported by the second horizontal rotary support member in such a manner as to be rotatable about the second horizontal rotary axis;

a second vertical rotary support member supporting the second rotary member in a manner allowing the second rotary member to rotate about the second vertical rotary axis; and a second fixed plate supporting the second vertical rotary support member and fixed to the second non-contact support member.

6. The drying apparatus according to claim 4, further comprising:

a gas supplier arranged on a predetermined side of the width direction of the printing medium relative to the first non-contact support member and the second non-contact support member;

a first duct connecting the gas supplier and an end on the predetermined side of the first non-contact support member to each other and supplying gas from the gas supplier to the first non-contact support member; and a second duct connecting the gas supplier and an end on the predetermined side of the second non-contact support member to each other and supplying gas from the gas supplier to the second non-contact support member, wherein the first non-contact support member injects the gas supplied by the first duct from the first injection holes, the second non-contact support member injects the gas supplied by the second duct from the second injection holes, the first rotary support supports the end on the predetermined side of the first non-contact support member, and the second rotary support supports the end on the predetermined side of the second non-contact support member.

7. The drying apparatus according to claim 4, wherein the first position adjuster includes:

a first movable bracket including a first body mounting part having a first vertical long hole parallel to the vertical direction, and a first plate mounting part extended from the first body mounting part in the horizontal direction and having a first horizontal long hole parallel to the horizontal direction;

a first support plate facing the first plate mounting part and mounted on the first non-contact support member;

a first body fastening member inserted into the first vertical long hole of the first body mounting part to fasten the first body mounting part to the body frame; and a first plate fastening member inserted into the first horizontal long hole of the first plate mounting part to fasten the first plate mounting part to the first support plate, and the second position adjuster includes:

a second movable bracket including a second body mounting part having a second vertical long hole parallel to the vertical direction, and a second plate mounting part extended from the second body mounting part in the horizontal direction and having a second horizontal long hole parallel to the horizontal direction;

a second support plate facing the second plate mounting part and mounted on the second non-contact support member;

a second body fastening member inserted into the second vertical long hole of the second body mounting part to fasten the second body mounting part to the body frame; and a second plate fastening member inserted into the second horizontal long hole of the second plate mounting part to fasten the second plate mounting part to the second support plate.

8. The drying apparatus according to claim 7, wherein the first position adjuster includes:

a first horizontal adjustment plate having a first pressure screw hole extended in the horizontal direction and a first through hole extended in the horizontal direction, and mounted on the first non-contact support member;

a first pressure screw threadedly engaged with the first pressure screw hole; and a first tension screw inserted into the first through hole, a tip of the first pressure screw projects from the first pressure screw hole toward the first plate mounting part to abut on the first plate mounting part, a tip of the first tension screw projects from the first through hole toward the first plate mounting part to be threadedly engaged with a first tension screw hole formed at the first plate mounting part, a screw head of the first tension screw is located on the opposite side to the first plate mounting part relative to the first through hole and abuts on the first horizontal adjustment plate, screwing the first pressure screw toward the first plate mounting part into the first pressure screw hole makes the first plate mounting part get farther from the first horizontal adjustment plate, screwing the first tension screw toward the first plate mounting part into the first tension screw hole makes the first plate mounting part get closer to the first horizontal adjustment plate, the second position adjuster includes:

a second horizontal adjustment plate having a second pressure screw hole extended in the horizontal direction and a second through hole extended in the horizontal direction, and mounted on the second non-contact support member;

a second pressure screw threadedly engaged with the second pressure screw hole; and a second tension screw inserted into the second through hole, a tip of the second pressure screw projects from the second pressure screw hole toward the second plate mounting part to abut on the second plate mounting part, a tip of the second tension screw projects from the second through hole toward the second plate mounting part to be threadedly engaged with a second tension screw hole formed at the second plate mounting part, a screw head of the second tension screw is located on the opposite side to the second plate mounting part relative to the second through hole and abuts on the second horizontal adjustment plate, screwing the second pressure screw toward the second plate mounting part into the second pressure screw hole makes the second plate mounting part get farther from the second horizontal adjustment plate, and screwing the second tension screw toward the second plate mounting part into the second tension screw hole makes the second plate mounting part get closer to the second horizontal adjustment plate.

9. The drying apparatus according to claim 7, wherein the first position adjuster includes:

a first vertical adjustment plate having a first lifting screw hole extended in the vertical direction, and mounted on the body frame below the first body mounting part; and a first lifting screw threadedly engaged with the first lifting screw hole, a tip of the first lifting screw projects upward from the first lifting screw hole toward the first body mounting part to abut on the first body mounting part, screwing the first lifting screw toward the first body mounting part into the first lifting screw hole lifts the first body mounting part upward, the second position adjuster includes:

a second vertical adjustment plate having a second lifting screw hole extended in the vertical direction, and mounted on the body frame below the second body mounting part; and a second lifting screw threadedly engaged with the second lifting screw hole, a tip of the second lifting screw projects upward from the second lifting screw hole toward the second body mounting part to abut on the second body mounting part, and screwing the second lifting screw toward the second body mounting part into the second lifting screw hole lifts the second body mounting part upward.

10. A printing medium anti-drop method of preventing drop of an elongated strip-shaped printing medium having a printing surface on which ink is adhered and a non-printing surface on the reverse side from the printing surface in a drying apparatus comprising: a first transfer part that transfers the printing medium toward one side of a horizontal direction with the printing surface pointed downward; a first non-contact support member that changes a traveling direction of the printing medium having been transferred from the first transfer part toward the one side from a direction toward the one side of the horizontal direction to a downward direction; a second non-contact support member that changes a traveling direction of the printing medium having been transferred downward from the first non-contact support member from the downward direction to a direction toward the other side of the horizontal direction on the reverse side from the one side; and a second transfer part that transfers the printing medium having been transferred toward the other side of the horizontal direction from the second non-contact support member toward the other side of the horizontal direction with the printing surface pointed upward, the printing medium anti-drop method comprising:

a first anti-drop step of preventing drop of the printing medium from the first non-contact support member by two first anti-drop members provided at corresponding both ends of the first non-contact support member in a width direction of the printing medium when the printing medium travels obliquely while deviated from the first non-contact support member to the first anti-drop member; and a second anti-drop step of preventing drop of the printing medium from the second non-contact support member by two second anti-drop members provided at corresponding both ends of the second non-contact support member in the width direction of the printing medium when the printing medium travels obliquely while deviated from the second non-contact support member to the second anti-drop member, wherein the first transfer part includes a plurality of first upper nozzles arranged in the horizontal direction above the printing medium and a plurality of first lower nozzles arranged in the horizontal direction below the printing medium, and injects gas onto the printing medium from the first upper nozzles and injects gas onto the printing medium from the first lower nozzles, the first non-contact support member includes a first support peripheral surface to face the printing surface of the printing medium having been transferred from the first transfer part toward the one side and a plurality of first injection holes opening at the first support peripheral surface, and supports the printing surface of the printing medium in a non-contact manner by injecting gas from the first injection holes onto the printing surface of the printing medium, the second non-contact support member includes a second support peripheral surface to face the printing surface of the printing medium having been transferred downward from the first non-contact support member and a plurality of second injection holes opening at the second support peripheral surface, and supports the printing surface of the printing medium in a non-contact manner by injecting gas from the second injection holes onto the printing surface of the printing medium, the second transfer part includes a plurality of second upper nozzles arranged in the horizontal direction above the printing medium having been transferred toward the other side of the horizontal direction from the second non-contact support member and a plurality of second lower nozzles arranged in the horizontal direction below the printing medium, and injects gas onto the printing medium from the second upper nozzles and injects gas onto the printing medium from the second lower nozzles, each of the first anti-drop members includes a first anti-drop peripheral surface adjoining the first support peripheral surface of the first non-contact support member in the width direction, each of the second anti-drop members includes a second anti-drop peripheral surface adjoining the second support peripheral surface of the second non-contact support member in the width direction, in the first anti-drop step, the gas injected from the first injection holes at the first support peripheral surface flows through a clearance between the first support peripheral surface and the printing surface of the printing medium facing the first support peripheral surface toward the first anti-drop peripheral surface to form a clearance between the first anti-drop peripheral surface and the printing surface of the printing medium facing the first anti-drop peripheral surface, and in the second anti-drop step, the gas injected from the second injection holes at the second support peripheral surface flows through a clearance between the second support peripheral surface and the printing surface of the printing medium facing the second support peripheral surface toward the second anti-drop peripheral surface to form a clearance between the second anti-drop peripheral surface and the printing surface of the printing medium facing the second anti-drop peripheral surface.

11. A drying apparatus comprising:

a first transfer part including a plurality of first upper nozzles arranged in a horizontal direction above an elongated strip-shaped printing medium having a printing surface on which ink is adhered and a non-printing surface on the reverse side from the printing surface, and a plurality of first lower nozzles arranged in the horizontal direction below the printing medium, the first transfer part injecting gas onto the printing medium from the first upper nozzles and injecting gas onto the printing medium from the first lower nozzles, and transferring the printing medium toward one side of the horizontal direction with the printing surface pointed downward;

a first non-contact support member including a first support peripheral surface to face the printing surface of the printing medium having been transferred from the first transfer part toward the one side, and a plurality of first injection holes opening at the first support peripheral surface, the first non-contact support member changing a traveling direction of the printing medium from a direction toward the one side of the horizontal direction to a downward direction while supporting the printing surface of the printing medium in a non-contact manner by injecting gas from the first injection holes onto the printing surface of the printing medium;

a second non-contact support member including a second support peripheral surface to face the printing surface of the printing medium having been transferred downward from the first non-contact support member, and a plurality of second injection holes opening at the second support peripheral surface, the second non-contact support member changing a traveling direction of the printing medium from the downward direction to a direction toward the other side of the horizontal direction on the reverse side from the one side while supporting the printing surface of the printing medium in a non-contact manner by injecting gas from the second injection holes onto the printing surface of the printing medium;

a second transfer part including a plurality of second upper nozzles arranged in the horizontal direction above the printing medium having been transferred toward the other side of the horizontal direction from the second non-contact support member, and a plurality of second lower nozzles arranged in the horizontal direction below the printing medium, the second transfer part injecting gas onto the printing medium from the second upper nozzles and injecting gas onto the printing medium from the second lower nozzles, and transferring the printing medium toward the other side of the horizontal direction with the printing surface pointed upward;

a body frame supporting the first transfer part and the second transfer part;

a first positioning part positioning the first non-contact support member relative to the body frame; and a second positioning part positioning the second non-contact support member relative to the body frame, wherein the first positioning part includes a first rotary support and a first position adjuster, and supports both ends of the first non-contact support member by the first rotary support and the first position adjuster, the first rotary support supports the first non-contact support member relative to the body frame in a manner allowing the first non-contact support member to rotate in each of a rotary direction about a first horizontal rotary axis parallel to the horizontal direction and a rotary direction about a first vertical rotary axis parallel to a vertical direction, the first position adjuster supports the first non-contact support member relative to the body frame in a manner allowing the position of the first non-contact support member relative to the body frame to be adjusted in each of the horizontal direction and the vertical direction, the second positioning part includes a second rotary support and a second position adjuster, and supports both ends of the second non-contact support member by the second rotary support and the second position adjuster, the second rotary support supports the second non-contact support member relative to the body frame in a manner allowing the second non-contact support member to rotate in each of a rotary direction about a second horizontal rotary axis parallel to the horizontal direction and a rotary direction about a second vertical rotary axis parallel to the vertical direction, and the second position adjuster supports the second non-contact support member relative to the body frame in a manner allowing the position of the second non-contact support member relative to the body frame to be adjusted in each of the horizontal direction and the vertical direction.

12. The drying apparatus according to claim 11, wherein the first rotary support includes:

a first fixed bracket fixed to the body frame;

a first horizontal rotary support member mounted on the first fixed bracket;

a first rotary member supported by the first horizontal rotary support member in such a manner as to be rotatable about the first horizontal rotary axis;

a first vertical rotary support member supporting the first rotary member in a manner allowing the first rotary member to rotate about the first vertical rotary axis; and a first fixed plate supporting the first vertical rotary support member and fixed to the first non-contact support member, and the second rotary support includes:

a second fixed bracket fixed to the body frame;

a second horizontal rotary support member mounted on the second fixed bracket;

a second rotary member supported by the second horizontal rotary support member in such a manner as to be rotatable about the second horizontal rotary axis;

a second vertical rotary support member supporting the second rotary member in a manner allowing the second rotary member to rotate about the second vertical rotary axis; and a second fixed plate supporting the second vertical rotary support member and fixed to the second non-contact support member.

13. The drying apparatus according to claim 11, further comprising:

a gas supplier arranged on a predetermined side of the width direction of the printing medium relative to the first non-contact support member and the second non-contact support member;

a first duct connecting the gas supplier and an end on the predetermined side of the first non-contact support member to each other and supplying gas from the gas supplier to the first non-contact support member; and a second duct connecting the gas supplier and an end on the predetermined side of the second non-contact support member to each other and supplying gas from the gas supplier to the second non-contact support member, wherein the first non-contact support member injects the gas supplied by the first duct from the first injection holes, the second non-contact support member injects the gas supplied by the second duct from the second injection holes, the first rotary support supports the end on the predetermined side of the first non-contact support member, and the second rotary support supports the end on the predetermined side of the second non-contact support member.

14. The drying apparatus according to claim 11, wherein the first position adjuster includes:

a first movable bracket including a first body mounting part having a first vertical long hole parallel to the vertical direction, and a first plate mounting part extended from the first body mounting part in the horizontal direction and having a first horizontal long hole parallel to the horizontal direction;

a first support plate facing the first plate mounting part and mounted on the first non-contact support member;

a first body fastening member inserted into the first vertical long hole of the first body mounting part to fasten the first body mounting part to the body frame; and a first plate fastening member inserted into the first horizontal long hole of the first plate mounting part to fasten the first plate mounting part to the first support plate, and the second position adjuster includes:

a second movable bracket including a second body mounting part having a second vertical long hole parallel to the vertical direction, and a second plate mounting part extended from the second body mounting part in the horizontal direction and having a second horizontal long hole parallel to the horizontal direction;

a second support plate facing the second plate mounting part and mounted on the second non-contact support member;

a second body fastening member inserted into the second vertical long hole of the second body mounting part to fasten the second body mounting part to the body frame; and a second plate fastening member inserted into the second horizontal long hole of the second plate mounting part to fasten the second plate mounting part to the second support plate.

15. The drying apparatus according to claim 14, wherein the first position adjuster includes:

a first horizontal adjustment plate having a first pressure screw hole extended in the horizontal direction and a first through hole extended in the horizontal direction, and mounted on the first non-contact support member;

a first pressure screw threadedly engaged with the first pressure screw hole; and a first tension screw inserted into the first through hole, a tip of the first pressure screw projects from the first pressure screw hole toward the first plate mounting part to abut on the first plate mounting part, a tip of the first tension screw projects from the first through hole toward the first plate mounting part to be threadedly engaged with a first tension screw hole formed at the first plate mounting part, a screw head of the first tension screw is located on the opposite side to the first plate mounting part relative to the first through hole and abuts on the first horizontal adjustment plate, screwing the first pressure screw toward the first plate mounting part into the first pressure screw hole makes the first plate mounting part get farther from the first horizontal adjustment plate, screwing the first tension screw toward the first plate mounting part into the first tension screw hole makes the first plate mounting part get closer to the first horizontal adjustment plate, the second position adjuster includes:

a second horizontal adjustment plate having a second pressure screw hole extended in the horizontal direction and a second through hole extended in the horizontal direction, and mounted on the second non-contact support member;

a second pressure screw threadedly engaged with the second pressure screw hole; and a second tension screw inserted into the second through hole, a tip of the second pressure screw projects from the second pressure screw hole toward the second plate mounting part to abut on the second plate mounting part, a tip of the second tension screw projects from the second through hole toward the second plate mounting part to be threadedly engaged with a second tension screw hole formed at the second plate mounting part, a screw head of the second tension screw is located on the opposite side to the second plate mounting part relative to the second through hole and abuts on the second horizontal adjustment plate, screwing the second pressure screw toward the second plate mounting part into the second pressure screw hole makes the second plate mounting part get farther from the second horizontal adjustment plate, and screwing the second tension screw toward the second plate mounting part into the second tension screw hole makes the second plate mounting part get closer to the second horizontal adjustment plate.

16. The drying apparatus according to claim 14, wherein the first position adjuster includes:

a first vertical adjustment plate having a first lifting screw hole extended in the vertical direction, and mounted on the body frame below the first body mounting part; and a first lifting screw threadedly engaged with the first lifting screw hole, a tip of the first lifting screw projects upward from the first lifting screw hole toward the first body mounting part to abut on the first body mounting part, screwing the first lifting screw toward the first body mounting part into the first lifting screw hole lifts the first body mounting part upward, the second position adjuster includes:

a second vertical adjustment plate having a second lifting screw hole extended in the vertical direction, and mounted on the body frame below the second body mounting part; and a second lifting screw threadedly engaged with the second lifting screw hole, a tip of the second lifting screw projects upward from the second lifting screw hole toward the second body mounting part to abut on the second body mounting part, and screwing the second lifting screw toward the second body mounting part into the second lifting screw hole lifts the second body mounting part upward.

17. A non-contact support member position adjusting method in a drying apparatus comprising: a first transfer part that transfers an elongated strip-shaped printing medium having a printing surface on which ink is adhered and a non-printing surface on the reverse side from the printing surface toward one side of a horizontal direction with the printing surface pointed downward; a first non-contact support member that changes a traveling direction of the printing medium having been transferred from the first transfer part toward the one side from a direction from a direction toward the one side of the horizontal direction to a downward direction; a second non-contact support member that changes a traveling direction of the printing medium having been transferred downward from the first non-contact support member from the downward direction to a direction toward the other side of the horizontal direction on the reverse side from the one side; and a second transfer part that transfers the printing medium having been transferred toward the other side of the horizontal direction from the second non-contact support member toward the other side of the horizontal direction with the printing surface pointed upward, the non-contact support member position adjusting method comprising:

a first position adjusting step of adjusting the position of the first non-contact support member by a first positioning part positioning the first non-contact support member relative to a body frame supporting the first transfer part and the second transfer part; and a second position adjusting step of adjusting the position of the second non-contact support member by a second positioning part positioning the second non-contact support member relative to the body frame, wherein the first transfer part includes a plurality of first upper nozzles arranged in the horizontal direction above the printing medium and a plurality of first lower nozzles arranged in the horizontal direction below the printing medium, and injects gas onto the printing medium from the first upper nozzles and injects gas onto the printing medium from the first lower nozzles, the first non-contact support member includes a first support peripheral surface to face the printing surface of the printing medium having been transferred from the first transfer part toward the one side and a plurality of first injection holes opening at the first support peripheral surface, and supports the printing surface of the printing medium in a non-contact manner by injecting gas from the first injection holes onto the printing surface of the printing medium, the second non-contact support member includes a second support peripheral surface to face the printing surface of the printing medium having been transferred downward from the first non-contact support member and a plurality of second injection holes opening at the second support peripheral surface, and supports the printing surface of the printing medium in a non-contact manner by injecting gas from the second injection holes onto the printing surface of the printing medium, the second transfer part includes a plurality of second upper nozzles arranged in the horizontal direction above the printing medium having been transferred toward the other side of the horizontal direction from the second non-contact support member and a plurality of second lower nozzles arranged in the horizontal direction below the printing medium, and injects gas onto the printing medium from the second upper nozzles and injects gas onto the printing medium from the second lower nozzles, the first positioning part includes a first rotary support and a first position adjuster, and supports both ends of the first non-contact support member by the first rotary support and the first position adjuster, the first rotary support supports the first non-contact support member relative to the body frame in a manner allowing the first non-contact support member to rotate in each of a rotary direction about a first horizontal rotary axis parallel to the horizontal direction and a rotary direction about a first vertical rotary axis parallel to a vertical direction, the first position adjuster supports the first non-contact support member relative to the body frame in a manner allowing the position of the first non-contact support member relative to the body frame to be adjusted in each of the horizontal direction and the vertical direction, the second positioning part includes a second rotary support and a second position adjuster, and supports both ends of the second non-contact support member by the second rotary support and the second position adjuster, the second rotary support supports the second non-contact support member relative to the body frame in a manner allowing the second non-contact support member to rotate in each of a rotary direction about a second horizontal rotary axis parallel to the horizontal direction and a rotary direction about a second vertical rotary axis parallel to the vertical direction, and the second position adjuster supports the second non-contact support member relative to the body frame in a manner allowing the position of the second non-contact support member relative to the body frame to be adjusted in each of the horizontal direction and the vertical direction.

* * * * *